United States Patent
Tseng et al.

(10) Patent No.: US 8,938,030 B2
(45) Date of Patent: Jan. 20, 2015

(54) FAST BLIND SCAN METHOD INSENSITIVE TO ADJACENT CHANNEL INTERFERENCE

(71) Applicant: Sunplus Technology Co., Ltd., Hsinchu (TW)

(72) Inventors: Chun-Chieh Tseng, Taoyuan County (TW); Chih-Yao Chiang, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 125 days.

(21) Appl. No.: 13/886,470

(22) Filed: May 3, 2013

(65) Prior Publication Data

US 2014/0173668 A1      Jun. 19, 2014

(30) Foreign Application Priority Data

Dec. 19, 2012   (TW) .............................. 101148297 A

(51) Int. Cl.
  *H04L 27/00*   (2006.01)
  *H04N 21/647*  (2011.01)
  *H04N 21/61*   (2011.01)
  *H04N 21/643*  (2011.01)

(52) U.S. Cl.
  CPC ..... *H04N 21/64784* (2013.01); *H04N 21/6143* (2013.01); *H04N 21/643* (2013.01)

USPC .......................................................... 375/326

(58) Field of Classification Search
  USPC .......................................................... 375/326
  See application file for complete search history.

(56) References Cited

U.S. PATENT DOCUMENTS

| | | | |
|---|---|---|---|
| 7,676,198 B2 * | 3/2010 | Mahany | 455/69 |
| 2004/0028003 A1 * | 2/2004 | Diener et al. | 370/319 |

* cited by examiner

*Primary Examiner* — Don N Vo
(74) *Attorney, Agent, or Firm* — Bacon & Thomas, PLLC

(57) ABSTRACT

A fast blind scan method first initializes pointers to fetch a block of spectrum and then checks whether the block contains a high spectrum signal and whether the difference between a carrier frequency of the high spectrum signal and a start pointer is greater than a first threshold. When the high spectrum signal is absent or the difference is not greater than the first threshold, it checks whether there is a full band channel in the block. When the full band channel exists, a signal detection and parameter extraction operation is performed and the start pointer is set to be a frequency of a second cross point. Then, it checks whether the difference between the start pointer and an end pointer is greater than a second threshold and, if not, a carrier frequency pointer is set to enable a tuner to fetch a next block.

16 Claims, 24 Drawing Sheets

(PT): Programming tuner frequency to fetch next block of spectrum (PT): Programming tuner frequency to fetch next block of spectrum (PT): Programming tuner frequency to fetch next block of spectrum

| Sharp7306 | | 13V (Vertical) | 18V (Horizontal) |
|---|---|---|---|
| 22k | Present Invention | 1'16" | 1'07" |
| | Prior Art | 2'01" | 1'27" |
| non22k | Present Invention | 12" | 1'58" |
| | Prior Art | 35" | 3'55" |

FIG. 24

FAST BLIND SCAN METHOD INSENSITIVE TO ADJACENT CHANNEL INTERFERENCE

BACKGROUND OF THE INVENTION

1. Field of the Invention

The present invention relates to the technical field of satellite television transmission and, more particularly, to a fast blind scan method insensitive to adjacent channel interference, which is suitable for a Digital Video Broadcasting-Satellite (DVB-S) or DVB-S2 system.

2. Description of Related Art

For broadly developing digital televisions, the first essential task is to establish a digital platform. In addition to pure hardware equipments such as a set-top box or television set, the digital platform includes digital channels and contents.

Current specifications for global digital televisions are classified essentially into several types: Advanced Television Systems Committee (ATSC) for American-based markets, Digital Video Broadcasting (DVB) for Euro-based markets, Digital Terrestrial Multimedia Broadcasting (DTMB) for China-based markets, and Terrestrial Integrated Services Digital Broadcasting (ISDB-T) for Japan-based markets. The DVB system can be further divided into DVB-C/C2, DVB-S/S2, and DVB-T/T2. The DVB-C/C2 represents the cable television standard. The DVB-S/S2 represents the satellite television standard. The DVB-T/T2 represents the terrestrial wireless television standard.

A central office system provider can transmit a DVB-S/S2 signal to a satellite antenna on a building through a satellite located over 32000 km and above. Such a transmission is applied to send MPEG2 data, and since the position (carrier frequency) and the symbol rate (bandwidth) of each channel on a frequency spectrum are not explicitly defined, the receiver can selectively pre-store the positions (carrier frequencies) and symbol rates (bandwidths) of all known channels in order to rapidly receive the programs.

However, when the carrier frequency and the symbol rate are changed for an updated channel, such a way may not receive the programs on the updated channel smoothly. Accordingly, for such a DVB-S receiver, a blind scan function is a must in order to provide a simple operating mode to thereby allow a user to have an automatic program scan without knowing the programs received by a satellite in advance. The scan rate and the accuracy are the most important indexes for evaluating the performance of the blind scan. In addition, the rapid scan can reduce the waiting time of the user.

FIG. 1 is a block diagram of a typical receiver. As shown, the operation principle is first to use a controller 11 to tune a tuner 12 to a carrier frequency (CF). Next, a filter bank (not shown) and a timing recovery loop (not shown) in a baseband demodulation chip 13 are started to operate with the least symbol rate (SR). The symbol rate is increased when the loop cannot converge. When the symbol rate is over a preset maximum and the loop cannot converge, it indicates that there is no signal at this frequency, and in this case the carrier frequency of the tuner 12 is updated by adding a step to the original basis. Accordingly, the above process is repeated until the loop converges and the signal and associated parameters are detected.

Such a process suffers a disadvantage of very slow scan rate. Since the range of possible symbol rate used by a DVB-S/S2 system is very large, such as from 1M to 45M bauds, and a satellite signal occupies a quite wide spectrum, such as an input range from 950 MHz to 2150 MHz for a Ku or C band tuner, the combination produces numerous possibilities. Accordingly, the blind scan method has to take long time to completely scan the entire possibilities once. In addition, it takes much time to change the carrier frequency of the tuner 12, which significantly prolongs the scan time due to the high step carrier frequencies. Further, the step resolution of the tuner is limited to, for example, hundreds of MHz. Thus, only changing the frequency of the analog tuner cannot accurately detect the carrier frequency. Moreover, the convergence of the loop is very slow, so that it is quite slow to loop-scan the symbol rate. As a result, the typical frequency scan has a very slow rate.

Another blind scan problem to be solved is to reduce the sensitivity of adjacent channel interference (ACI). The magnitudes of adjacent signals in the spectrum are quite different, and can be influenced by other systems or strong signal sources. Accordingly, the only way to achieve the fast and accurate channel scanning target is to reduce the sensitivity of adjacent channel interference. In US patent Publication No. 2011/0135042 filed by the same inventors for a "Blind scan system and method for a DVB-S system", it has improved the efficiency on the blind scan, but it cannot stand a huge difference on adjacent signal magnitudes.

Therefore, it is desirable to provide an improved fast blind scan method insensitive to adjacent channel interference for DVB-S or DVB-S2 system to mitigate and/or obviate the aforementioned problems.

SUMMARY OF THE INVENTION

The object of the present invention is to provide a fast blind scan method insensitive to adjacent channel interference, which is suitable for a DVB-S or DVB-S2 system and capable of preventing an adjacent channel signal with a small amplitude, i.e., a low spectrum signal, from being interfered by a channel signal with a large amplitude, i.e., a high spectrum signal, such that a weaker signal in the DVB-S/S2 system can be detected and the scan rate can be speeded.

To achieve the object, the present invention provides a fast blind scan method insensitive to adjacent channel interference for a Digital Video Broadcasting-Satellite (DVB-S)/DVB-S2 system, which includes the steps of: (A) initializing pointers; (B) configuring a tuner for fetching a block of spectrum; (C) determining whether the block of spectrum contains a high spectrum signal and whether the difference between a carrier frequency of the high spectrum signal and a start pointer is greater than a first frequency gap threshold; (D) determining whether there is a full band channel in the block of spectrum when the high spectrum signal in the block of spectrum is absent or the difference between the carrier frequency of the high spectrum signal and the start pointer is not greater than the first frequency gap threshold; (E) performing a signal detection and parameter extraction operation when the full band channel exists in the block of spectrum; (F) setting the start pointer to be a frequency of a second cross point; (G) checking whether a difference between the start pointer and an end pointer is smaller than a second frequency gap threshold; and (H) setting a carrier frequency pointer when the difference between the start pointer and the end pointer is not smaller than the second frequency gap threshold, and executing step (B) to enable the tuner to fetch a next block of spectrum. A carrier frequency of the tuner and the start pointer are also set when an empty channel or partial band channel is detected. Thus, the fast blind scan method is complete.

Other objects, advantages, and novel features of the invention will become more apparent from the following detailed description when taken in conjunction with the accompanying drawings.

BRIEF DESCRIPTION OF THE DRAWINGS

FIG. 24 shows a table of comparison between the present invention and the prior art.

DETAILED DESCRIPTION OF THE PREFERRED EMBODIMENT

Figure 1:
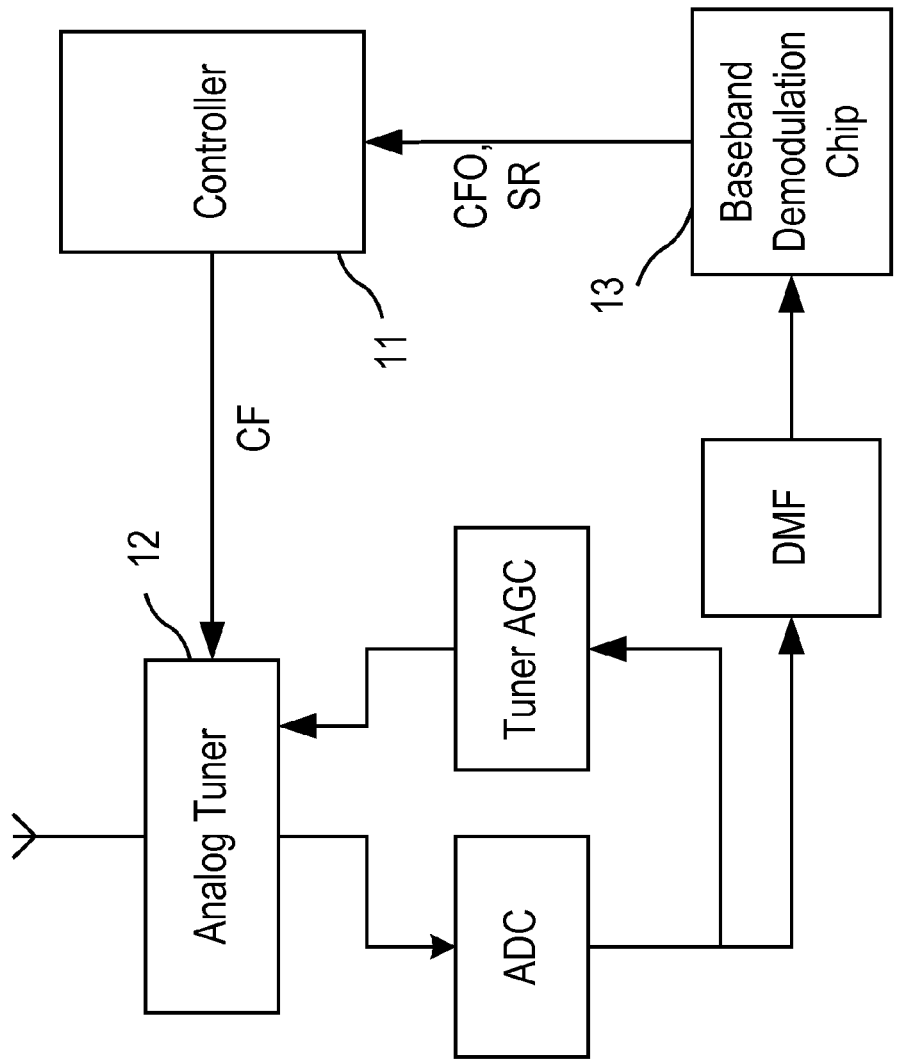
FIG. 1 is a block diagram of a typical receiver.
Figure 2:
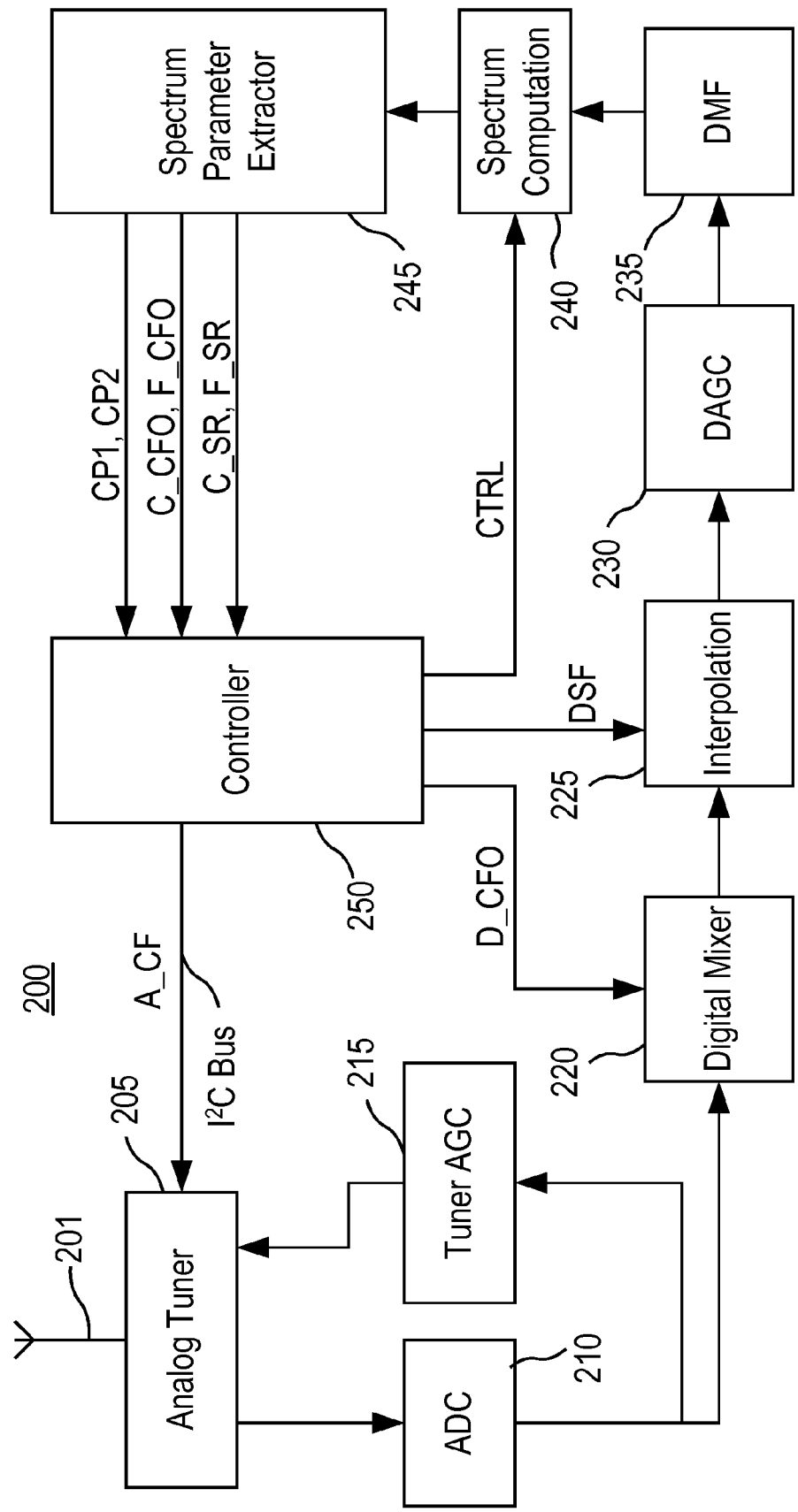
FIG. 2 is a block diagram of a system for executing a fast blind scan method insensitive to adjacent channel interference in a DVB-S/S2 system according to an embodiment of the invention.

FIG. 2 is a block diagram of a system 200 for executing a fast blind scan method insensitive to adjacent channel interference in a DVB-S/S2 system according to an embodiment of the present invention. In FIG. 2, the system 200 includes a tuner 205, an analog to digital converter (ADC) 210, a tuner auto-gain controller (AGC) 215, a digital mixer 220, an interpolation device 225, a digital auto-gain controller (DAGC) 230, a digital matched filter (DMF) 235, a spectrum computation device 240, a spectrum parameter extractor 245, and a controller 250.

In the US patent Publication No. 2011/0135042 filed by the same inventors for a "Blind scan system and method for a DVB-S system", it is focused on efficiency improvement on the blind scan method and has the hardware configuration as same as that used in the present invention, and thus no more hardware detail is described.

Figure 3:
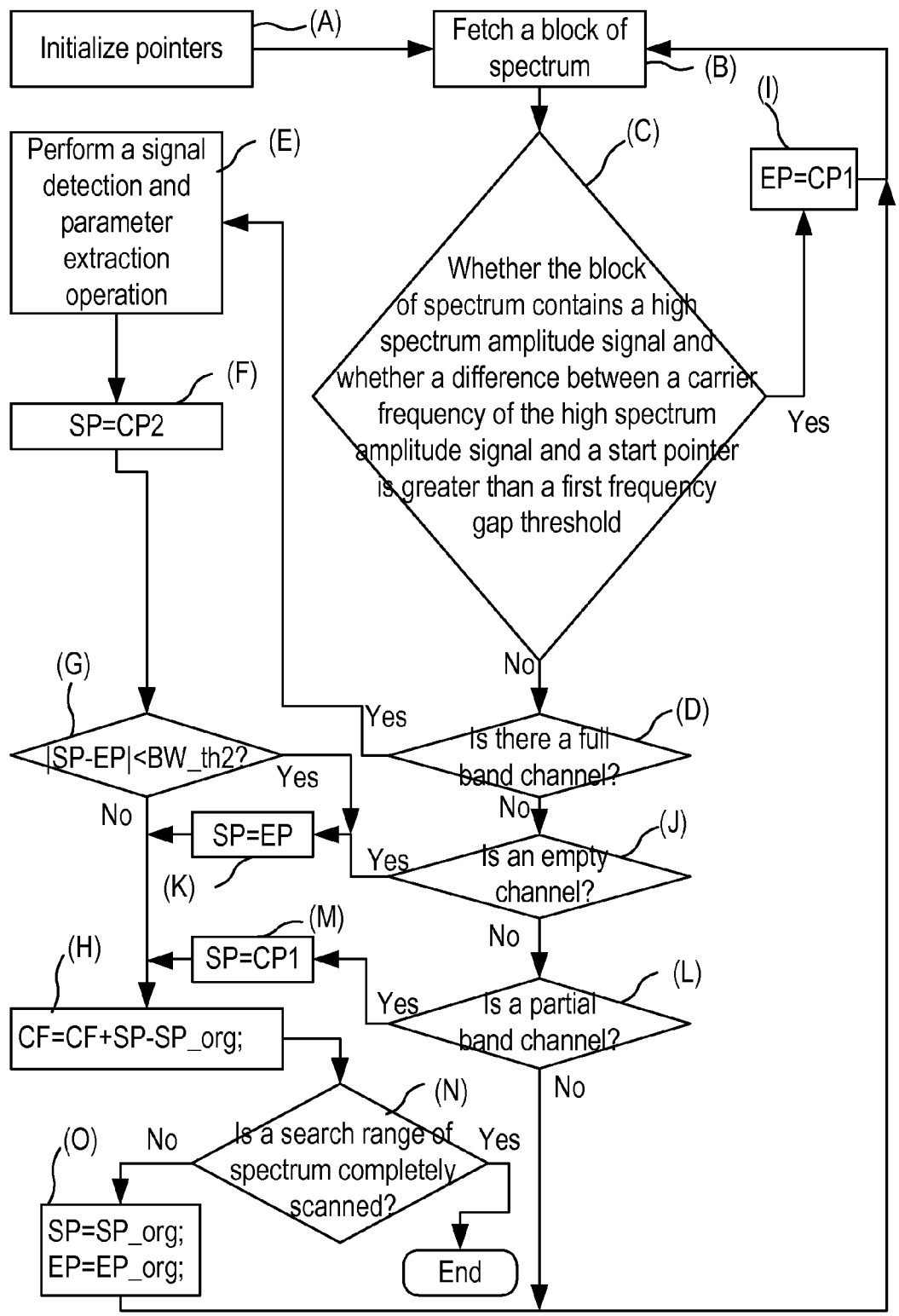
FIG. 3 is a flowchart of a fast blind scan method insensitive to adjacent channel interference in a DVB-S/S2 system according to an embodiment of the invention.

FIG. 3 is a flowchart of a fast blind scan method insensitive to adjacent channel interference for a DVB-S/S2 system according to an embodiment of the present invention. At first, step (A) initializes the pointers. The pointers include a start pointer SP, an end pointer EP, a carrier frequency pointer CF, an original start pointer SP_org, and an original end pointer EP_org.

The range of transmission band in DVB-S/S2 system is from 950 MHz to 2150 MHz, and each frequency band therein is from 1 MHz to 45 MHz. In this case, it is assumed that the lowest sampling rate is 90 MHz. In the initialization, the digital mixer 220 and the interpolation device 225 are inactive, simply allowing the signals to pass through. Accordingly, the start pointer SP and the original start pointer SP_org can be set to 950 MHz, the end pointer EP and the original end pointer EP_org are set to 995 MHz (950+45), and the carrier frequency pointer CF is set to 972.5 MHz (950+45/2).

In terms of the physical meaning, the interpolation device 225 at this moment outputs a digital spectrum with a DC portion corresponding to the carrier frequency pointer CF set by the tuner 205, and the difference between the start pointer SP and the end pointer EP (also the difference between EP_org and SP_org) is half the sampling rate, such that, when the digital mixer 220 and the interpolation device 225 are active, the two values can be adjusted effectively to detect the signals as required. This process is well known to those skilled in the prior art, and thus a detailed description is deemed unnecessary.

Step (B) configures the tuner 205 for fetching a block of spectrum.

Step (C) determines whether the block of spectrum contains a high spectrum signal and whether the difference between a carrier frequency of the high spectrum signal and the start pointer SP is greater than a first frequency gap threshold BW_th1. Namely, step (C) can be expressed by a mathematic formula as: $(|CP1-SP|>BW\_th1)\&(M>8m)$, which is depicted hereinafter.

From the above expression, it is known in step (C) that the mathematic formula $M>8m$ is used to determine the high spectrum signal, where M represents the highest value in the block of spectrum, and m represents the lowest value in the block of spectrum. Namely, step (C) checks in the block of spectrum to determine whether the high spectrum signal has the highest value M eight times the lowest value m.

It is also known in step (C) that the mathematic formula $|CP1-SP|>BW\_th1$ indicates that a frequency difference between the high spectrum signal and the start pointer SP is greater than the first frequency gap threshold BW_th1, where CP1 represents a first cross point at which the frequency in the block of spectrum is greater than an amplitude threshold amp_th at the first time, SP represents the start pointer, and BW_th1 represents the first frequency gap threshold.

Figure 4:
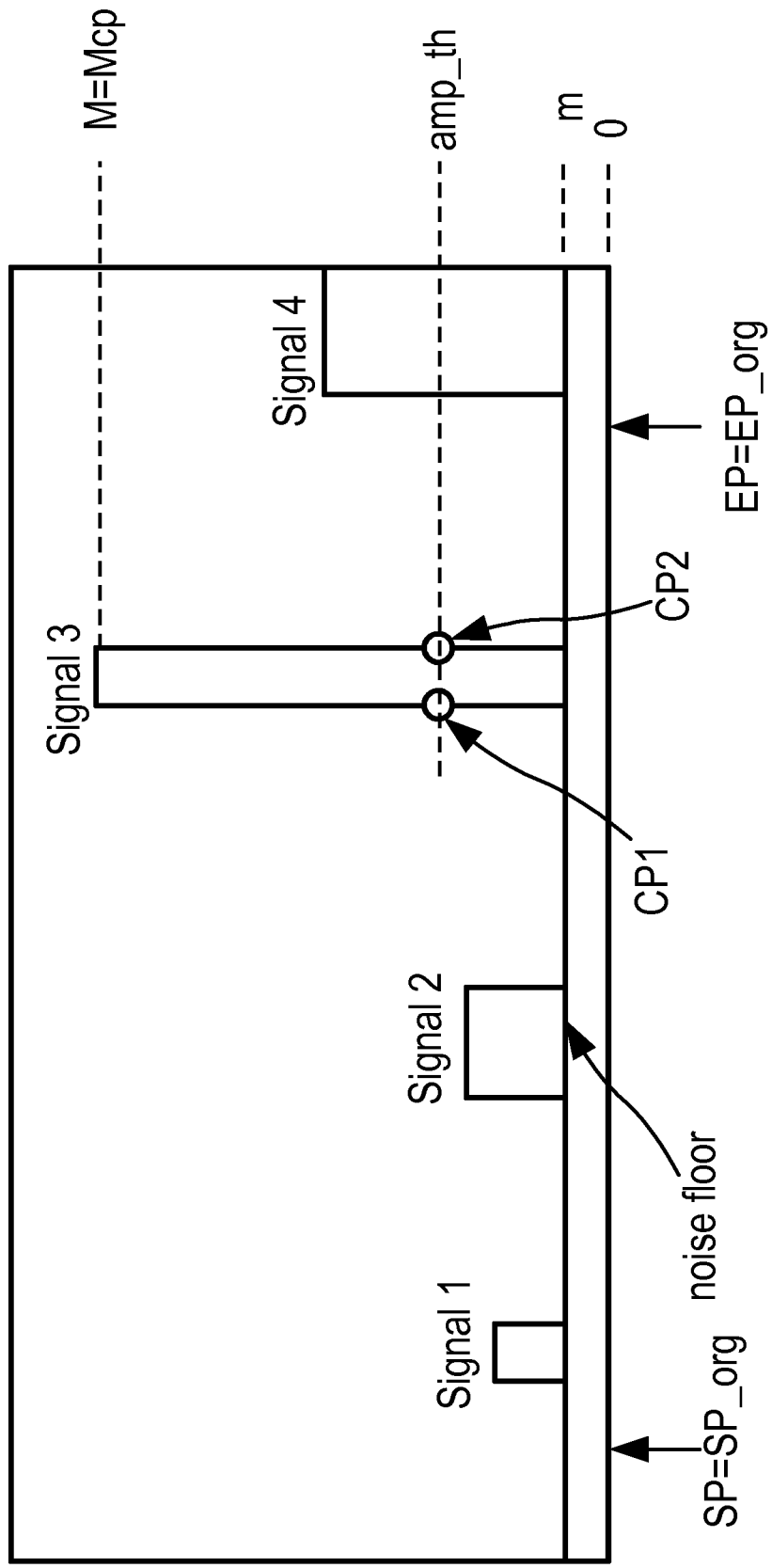
FIGS. 4-23 schematically illustrate an application according to an embodiment of the invention.

As shown in FIG. 4, there are three signals, i.e., signal 1, signal 2 and signal 3, between the start pointer SP and the end pointer EP. As compared with signals 1 and 2, signal 3 is a high spectrum signal, and in this case the highest value M in the block of spectrum indicates the amplitude of signal 3. Since the noise cannot be distinct from the low spectrum signals, the lowest value m in the block of spectrum is represented by a noise floor.

Accordingly, from the highest value M and the lowest value m, the amplitude threshold amp_th can be computed by an expression as follows.

$$\text{amp\_th}=(M-m)\times \eta,$$

where M represents the highest value in the block of spectrum, m represents the lowest value in the block of spectrum, and η represents a tuning factor. Preferably, the tuning factor η is 0.3.

As shown in FIG. 4, the second cross point CP2 represents a frequency in the block of spectrum smaller than the amplitude threshold amp_th at the first time.

When the high spectrum signal in the block of spectrum is absent or the difference between the carrier frequency of the high spectrum signal and the start pointer SP is not greater than the first frequency gap threshold BW_th1, step (D) subsequently determines whether there is a full band channel in the block of spectrum.

The full band channel in step (D) indicates that the frequency of the end pointer EP is greater than the frequency of the second cross point CP2, the frequency of the second cross point CP2 is greater than the frequency of the first cross point CP1, and the frequency of the first cross point CP1 is greater than the frequency of the start pointer SP. Namely, this step (D) can be expressed by a mathematic formula as: SP<CP1<CP2<EP.

In step (E), when the full band channel exists in the block of spectrum, a signal detection and parameter extraction operation is performed.

Step (F) sets the start pointer to be the frequency of the second cross point, which can be expressed by a mathematic formula as: SP=CP2.

Step (G) checks whether a difference between the start pointer and the end pointer EP is smaller than the second frequency gap threshold, which can be expressed by a mathematic formula as: |SP−EP|<BW_th2.

When step (G) determines that the difference between the start pointer and the end pointer is not smaller than the second frequency gap threshold BW_th2, step (H) sets the carrier frequency pointer CP and then step (N) is executed.

Step (N) determines whether a search range of spectrum is completely scanned. When the search range of spectrum is completely scanned, the process ends. On the other hand, when the search range of spectrum is not completely scanned, step (O) resets the start pointer SP and the end pointer EP, and subsequently step (B) is executed to thereby program the tuner to fetch a next block of spectrum.

When step (C) determines that the block of spectrum contains the high spectrum signal and the difference between the carrier frequency of the high spectrum signal and the start pointer SP is greater than the first frequency gap threshold BW_th1, step (I) sets the end pointer EP to be a frequency of the first cross point CP1, which can be expressed by a mathematic formula as: EP=CP1.

When step (D) determines that the full band channel in the block of spectrum is absent, step (J) subsequently determines whether there is an empty channel in the block of spectrum. The empty channel in step (J) indicates that the frequency of the first cross point CP1 equals to the frequency of the original end pointer SP_org, which is expressed by a mathematic formula as: (CP1=SP_org)&(CP2=EP_org).

When step (J) determines that the empty channel exists in the block of spectrum, step (K) sets the start pointer SP to be the end pointer EP, which is expressed by a mathematic formula as: SP=EP.

When step (J) determines that the empty channel does not exist in the block of spectrum, step (L) subsequently determines whether there is a partial band channel in the block of spectrum. The partial band channel in step (L) indicates that the frequency of the second cross point CP2 is greater than the frequency of the end pointer EP, which is expressed by a mathematic formula as: (CP2>EP).

When step (L) determines that there is the partial band channel in the block of spectrum, step (M) sets the start pointer SP to be a frequency of the first cross point CP1, which is expressed by a mathematic formula as: SP=CP1. When step (L) determines that the partial band channel in the block of spectrum is absent, the process returns to step (B).

Step (N) determines whether a search range of spectrum is completely scanned. When the search range of spectrum is completely scanned, the process ends, which is expressed by a mathematic formula as: CF>CF_max. Since the range of transmission band in the DVB-S/S2 system is from 950 MHz to 2150 MHz, the carrier frequency maximum CF_max can be preset to 2150 MHz. In other embodiments, for detecting more signals, the carrier frequency maximum CF_max can be preset to 2172.5 MHz (2150+22.5).

When step (N) determines that the search range of spectrum is not completely scanned, step (O) resets the start pointer SP and the end pointer EP, which is expressed by a mathematic expression as: SP=SP_org, EP=EP_org, and step (B) is executed.

When step (G) determines that the difference between the start pointer SP and the end pointer EP is smaller than the second frequency gap threshold BW_th2, step (K) is executed.

FIGS. 4-23 schematically illustrate an application according to an embodiment of the invention. As shown in FIG. 4, signal 3 is the high spectrum signal, which can easily cover signals 1 and 2. In the prior art, signal 1 and signal 2 cannot be accurately detected because of the high spectrum signal.

However, in the invention, due to the existing high spectrum signal, i.e., signal 3, the amplitude threshold amp_th is increased, such that the first cross point CP1 and the second cross point CP2 are crossed with signal 3. The left side of the start pointer SP represents the scanned spectrum, so that the blind scan starts with the spectrum on the right side of the start pointer SP and ends at the end pointer EP.

As shown in FIGS. 4-23, the two circles are crossed with the amplitude threshold amp_th, the left circle represents the first cross point CP1, and the right circle represents the second cross point CP2.

As shown in FIG. 4, the first cross point CP1 is much far away from the start pointer SP, and since signal 3 exists, the invention desires to scan the spectrum from the start pointer SP to the first cross point CP1, without directly skipping, so that step (I) sets the end pointer EP to be a frequency of the first cross point CP1 (EP=CP1).

Figure 5:
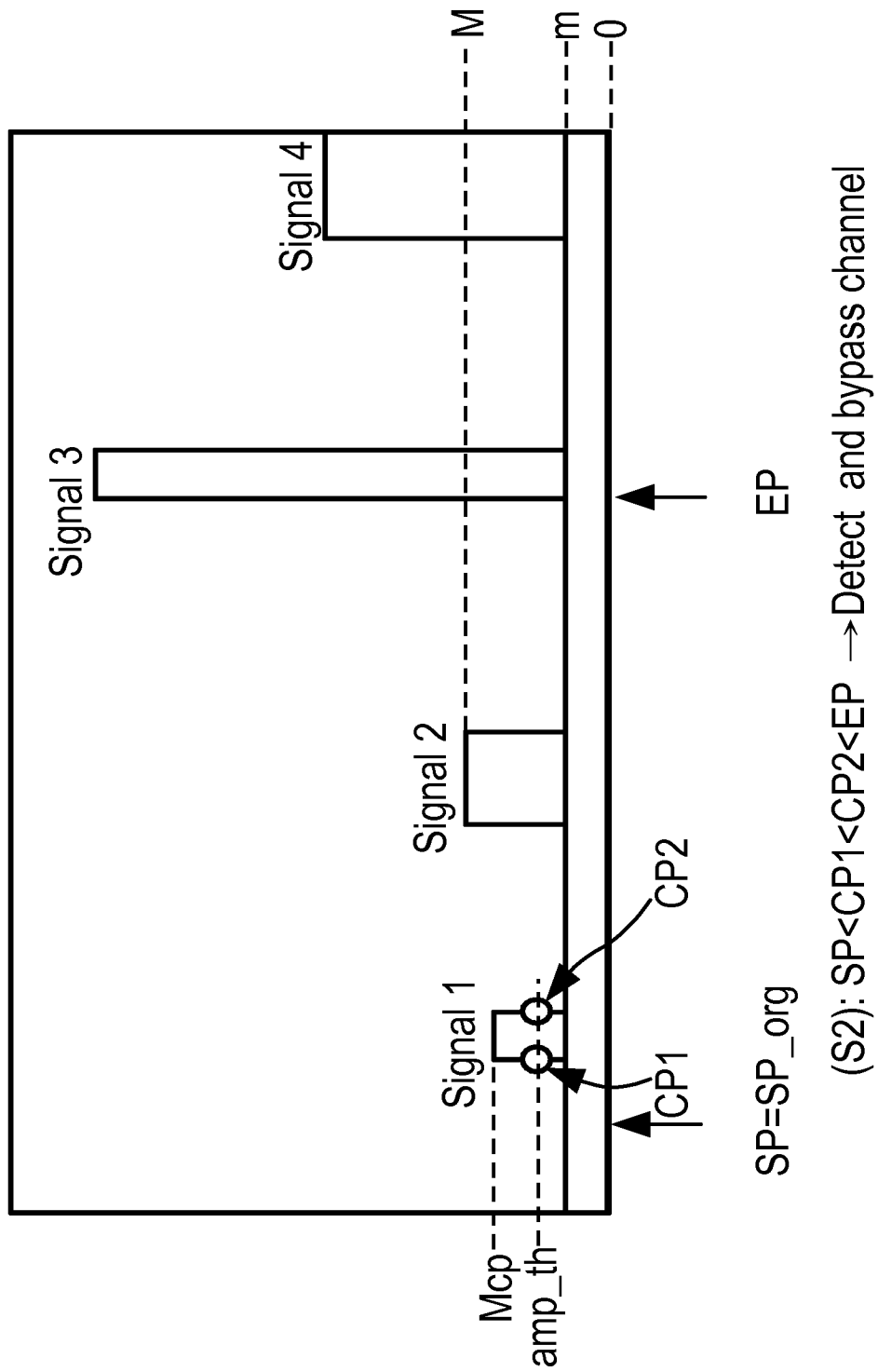

When one of the expressions (|CP1−SP|>BW_th1) and (M>8m) is not satisfied, step (D) is executed. As shown in FIG. 5, M is not greater than 8m, and in this case the high spectrum signal is absent between the start pointer SP and the end pointer EP. In addition, when the expression SP<CP1<CP2<EP is satisfied to indicate that there is a full band channel between the start pointer SP and the end pointer EP, step (E) is executed to perform a signal detection and parameter extraction operation.

Figure 6:
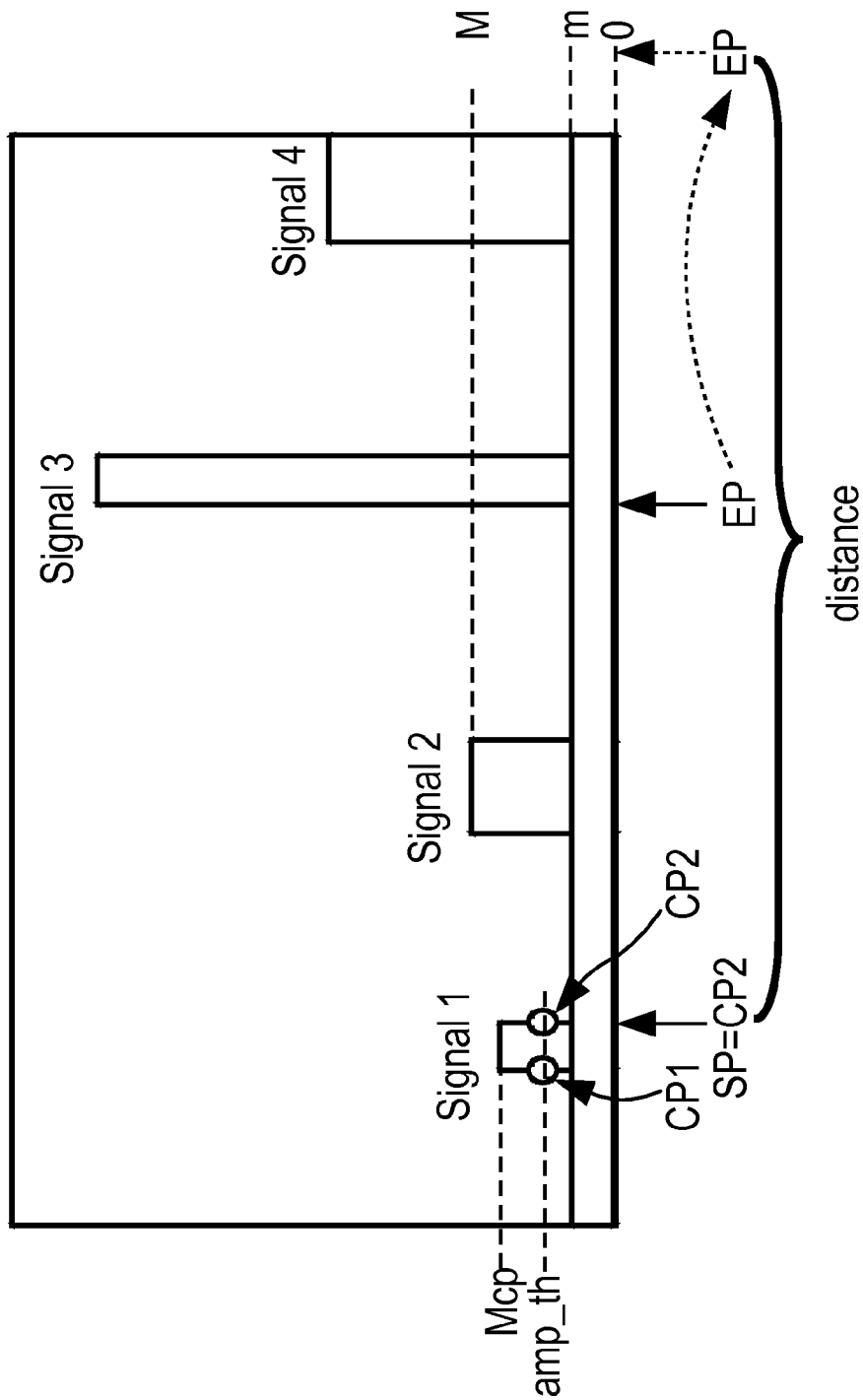

As shown in FIG. 6, after step (E) is executed, it indicates that signal 1 is detected and its parameters are extracted, so that the tuner 205 is configured to fetch a next block of spectrum (Programming Tuner, PT) and so on. Thus, step (F) sets the start pointer SP to be a frequency of the second cross point CP2. The technique associated with the signal detection and parameter extraction operation is described in US patent Publication No. 2011/0135042 filed by the same inventors for a "Blind scan system and method for a DVB-S system", which is incorporated herein for reference.

When step (G) determines that the difference between the start pointer SP and the end pointer EP is smaller than the second frequency gap threshold BW_th2, it indicates that the spectrum between the start pointer SP and the end pointer EP is too small to have a signal, so as to skip the frequencies between the start pointer SP and the end pointer EP and then step (K) is executed. On the other hand, as shown in FIG. 6, it indicates that one or more signals may exist in the spectrum between the start pointer SP and the end pointer EP when the spectrum is not too small (greater than BW_th2), and in this case step (H) is executed to set the carrier frequency pointer (CF) as CF=CF+SP−SP_org.

Figure 7:
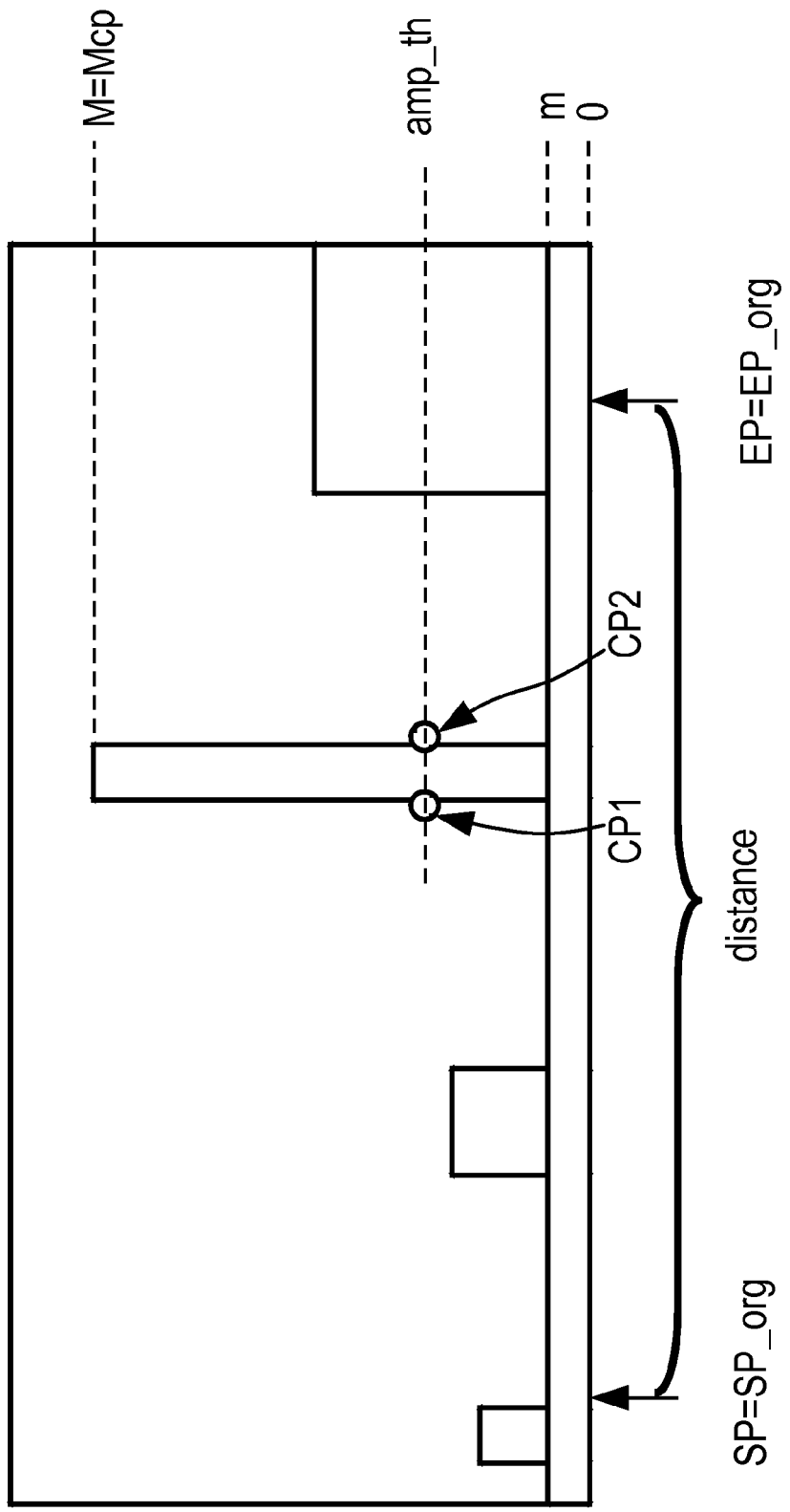

Step (N) determines whether the search range of spectrum is completely scanned, and if not (CF>CF_max not satisfied), step (O) is executed to set the start pointer SP=SP_org and the end pointer EP=EP_org and step (B) is executed to enable the tuner to fetch the next block of spectrum, as shown in FIG. 7.

Figure 8:
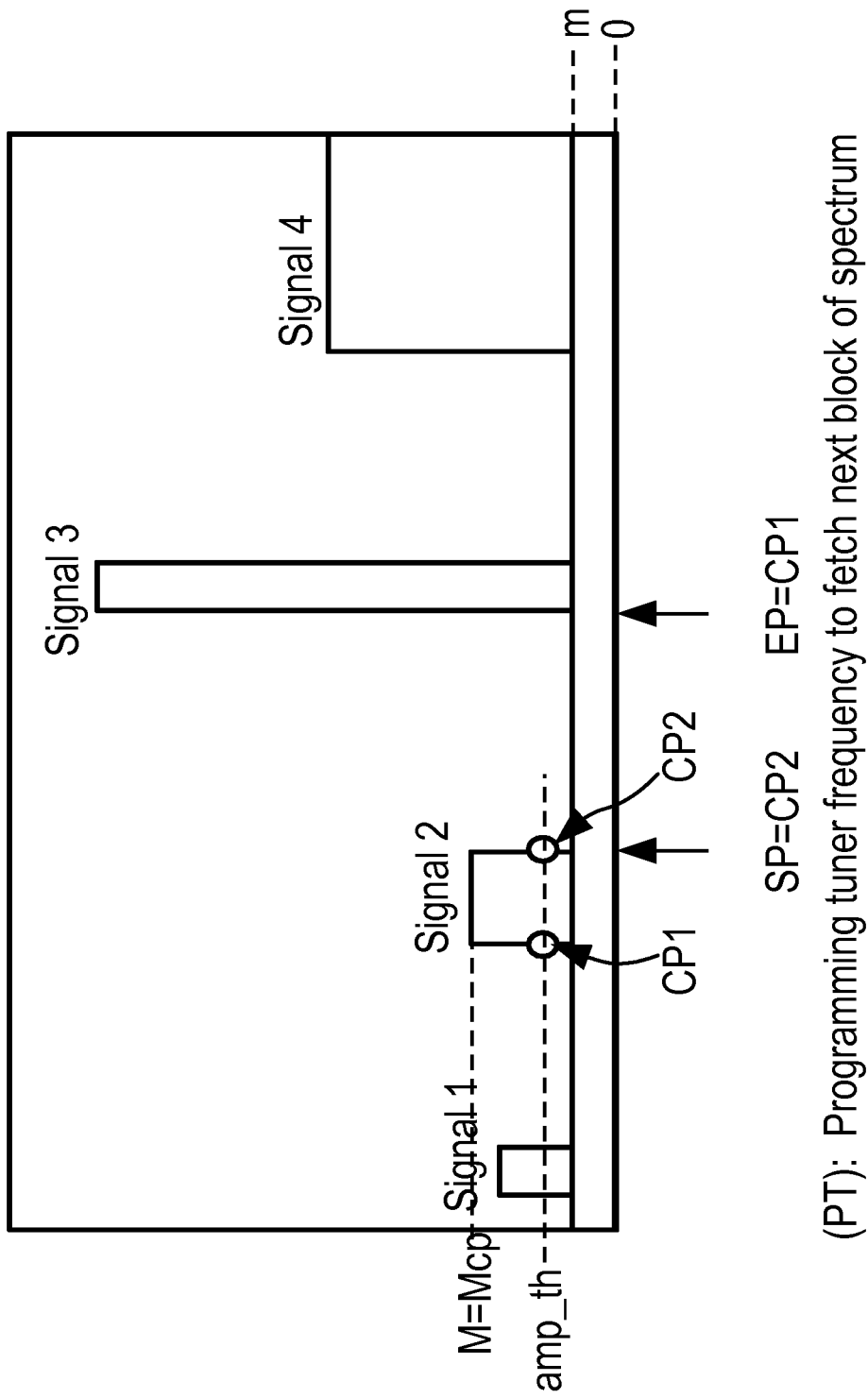

In FIG. 8, since the signal 3 with high spectrum amplitude exists in the spectrum between the start pointer SP and the end pointer EP, step (I) is executed to set the end pointer EP to be a frequency of the first cross point CP1.

Figure 9:
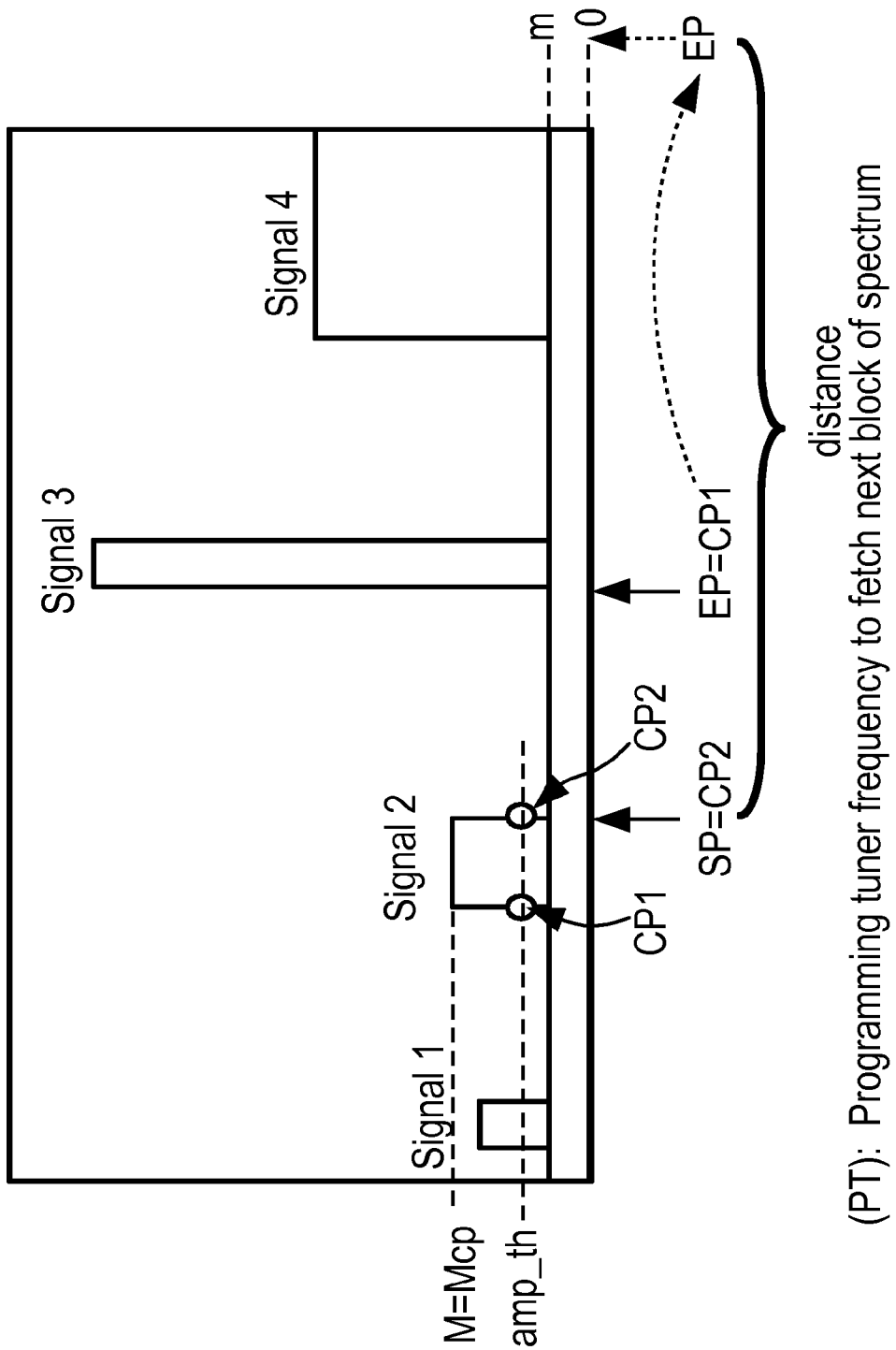

Next, after executing steps (D) and (E), signal 2 is detected and its parameters are extracted. As shown in FIG. 9, step (F) sets the start pointer SP to be a frequency of the second cross point CP2. As shown, the spectrum between the start pointer SP and the end pointer EP is not too small (greater than BW_th2), indicating that one or more signals may exist, and thus steps (H), (N), and (O) are executed to fetch the next block of spectrum.

Figure 10:
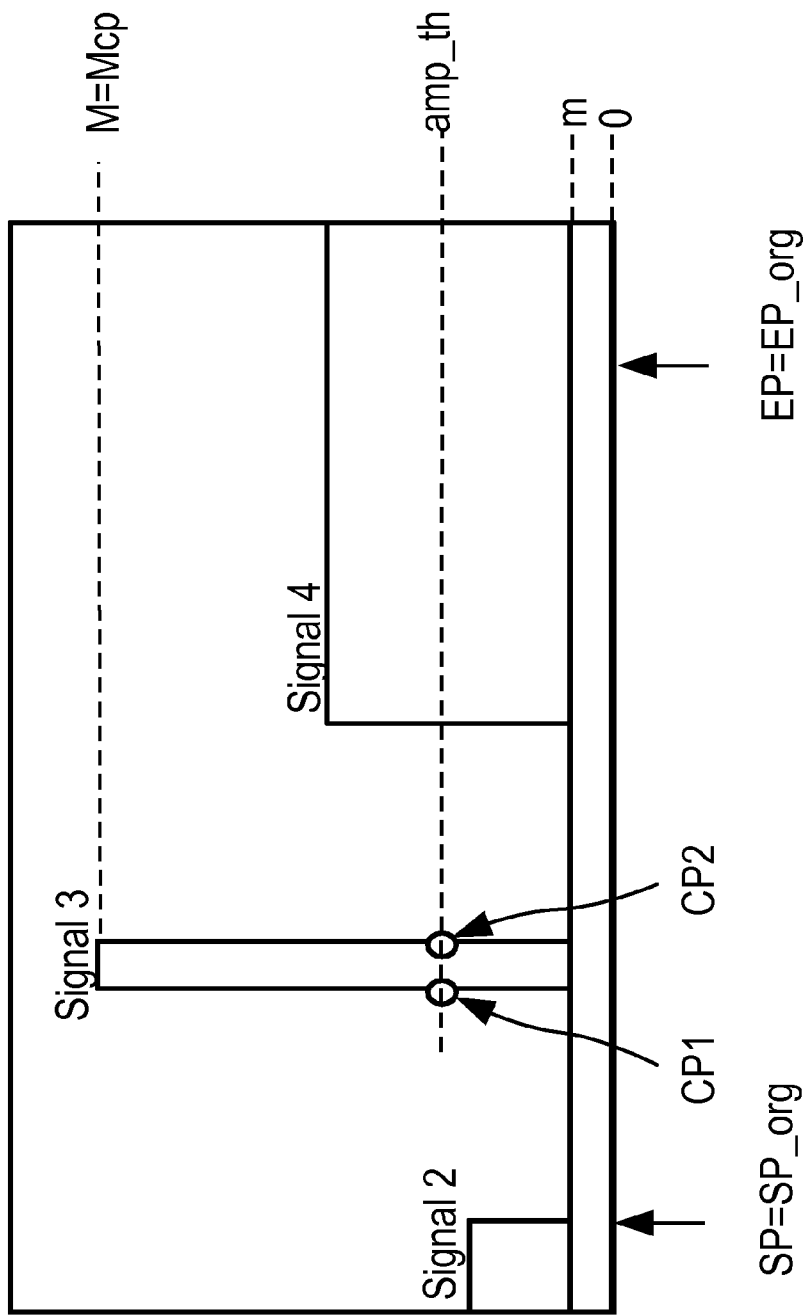
Figure 11:
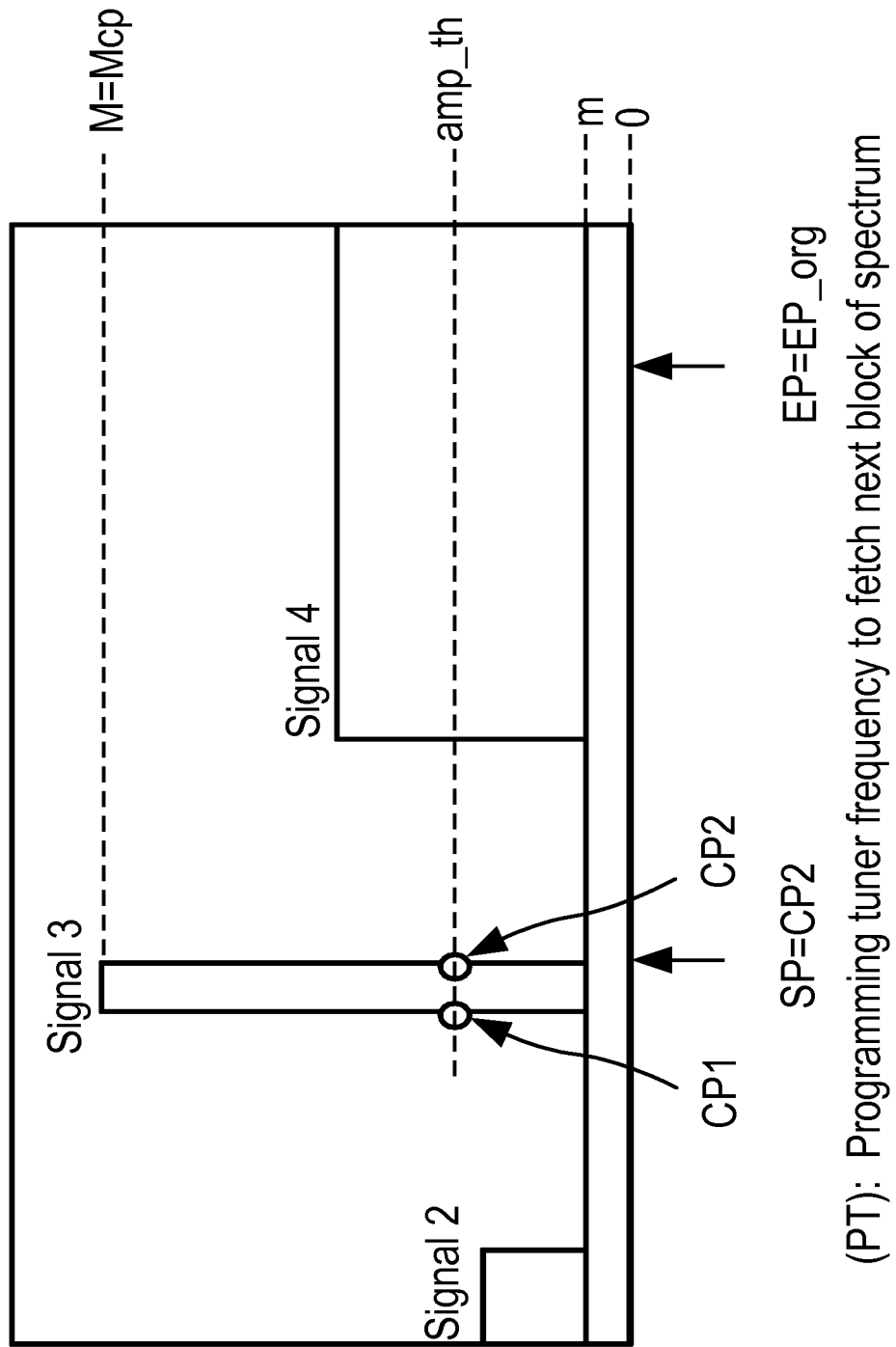

As shown in FIG. 10, as the spectrum between the start pointer SP and the first cross point CP1 is not too large, the expression (|CCP1−SP|>BW_th1) in step (C) is not satisfied, and thus step (D) is executed. Further, when the expression SP<CP1<CP2<EP in step (D) is satisfied, it indicates that there is the full band channel in the spectrum between the pointers SP and EP, and thus step (E) is executed to perform a signal detection and parameter extraction operation on signal 3 and step (F) is executed to set the start pointer SP to be a frequency of the second cross point CP2, as shown in FIG. 11. When the difference between the start pointer SP and the end pointer EP is not small than the second frequency gap threshold BW_th2, steps (H), (N), and (O) are executed to fetch the next block of spectrum, as shown in FIG. 12.

Figure 12:
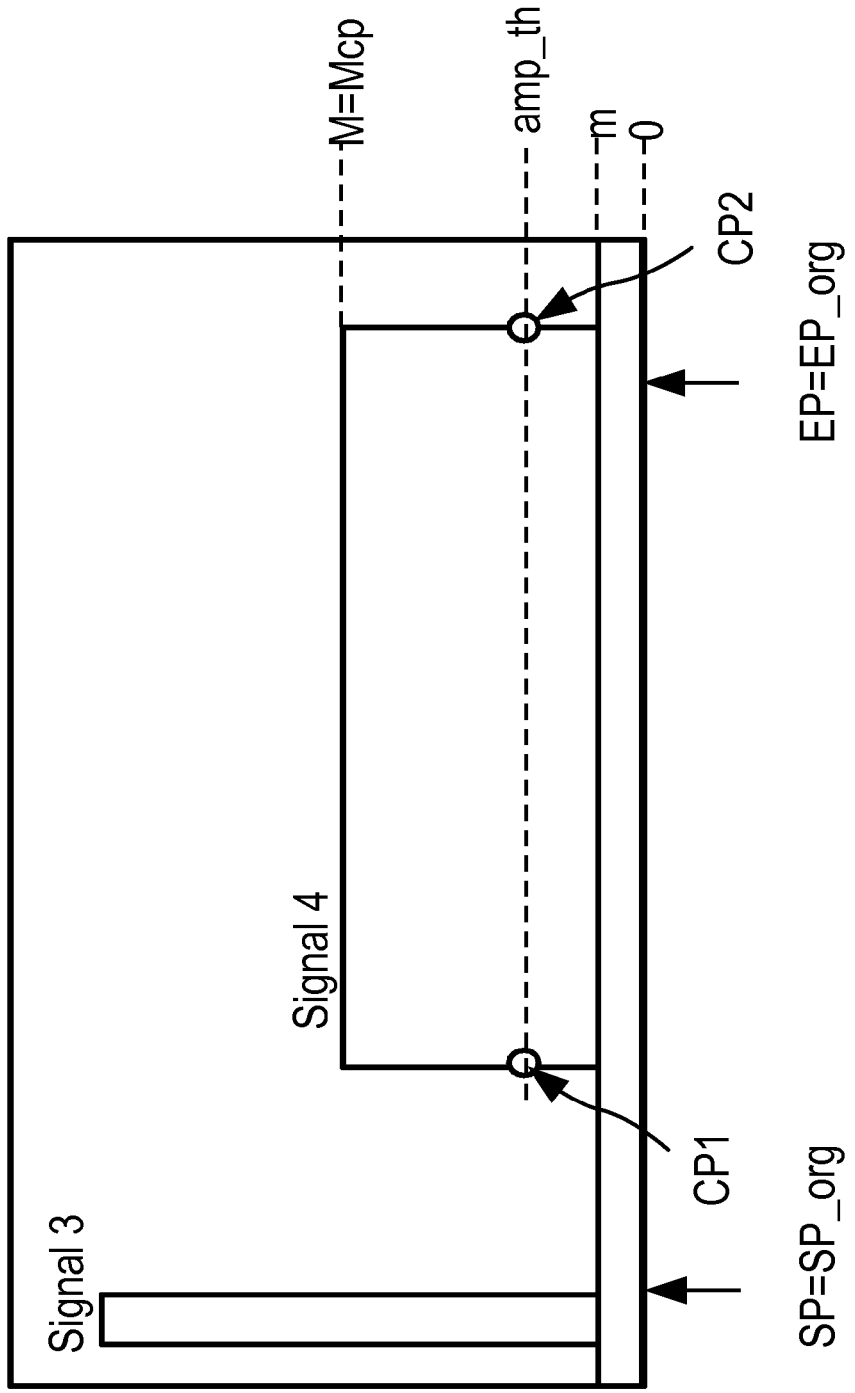

With reference to FIG. 12, after executing step (C), it is determined that CP2 is greater than EP, so that the expression SP<CP1<CP2<EP in step (D) is not satisfied to indicate that there is the empty channel in the block of spectrum, but not the full band channel. Thus, step (J) subsequently determines CP1=SP_org and CP2=EP_org. As shown in FIG. 12, if not being satisfied, step (L) is executed.

Figure 13:
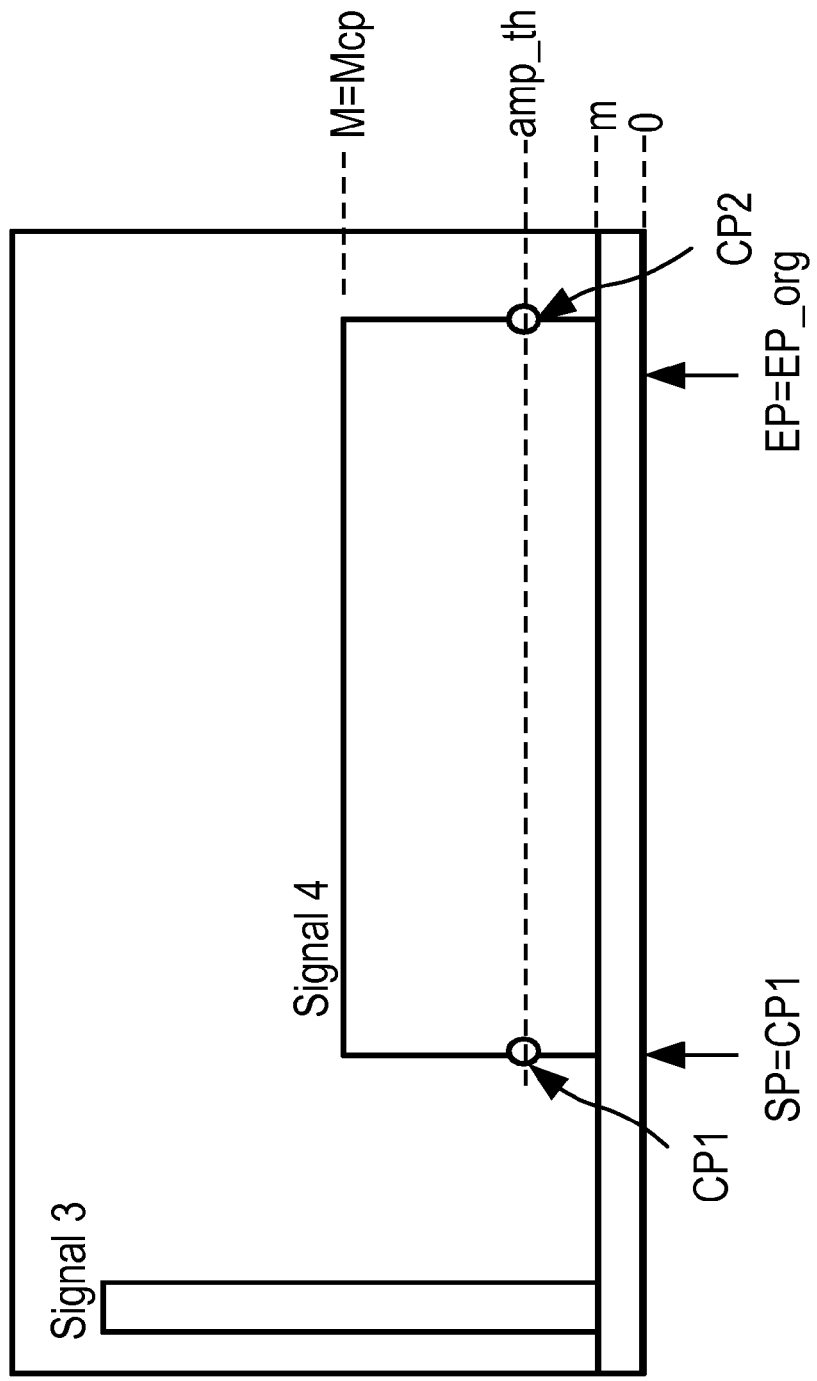

Step (L) determines whether CP2 is greater than EP. When CP2 is greater than EP, step (M) is executed to set the start pointer SP to be a frequency of the first cross point CP1, as shown in FIG. 13, and then steps (H), (N), and (O) are executed to fetch the next block of spectrum, as shown in FIG. 14.

Figure 14:
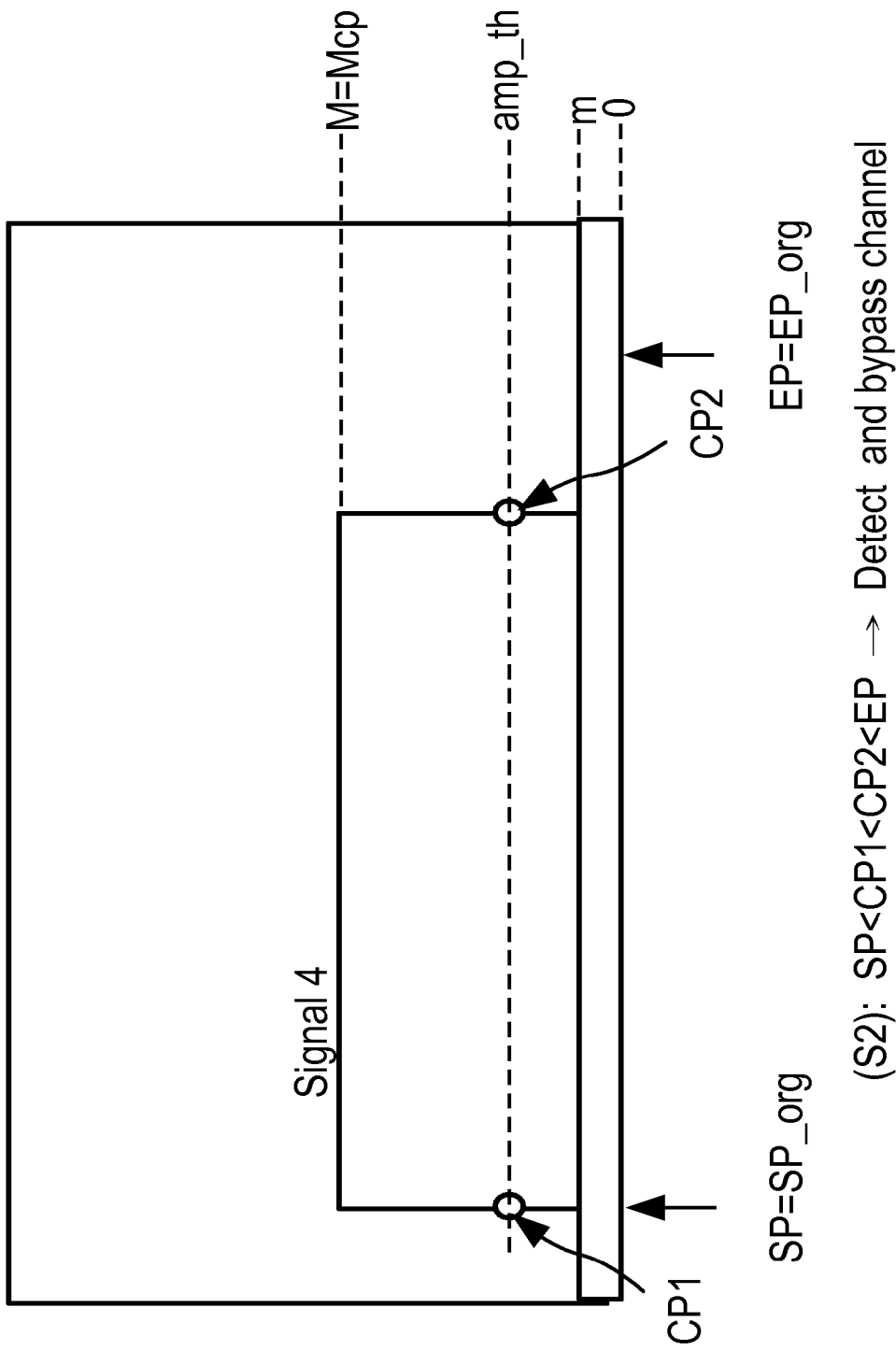
Figure 15:
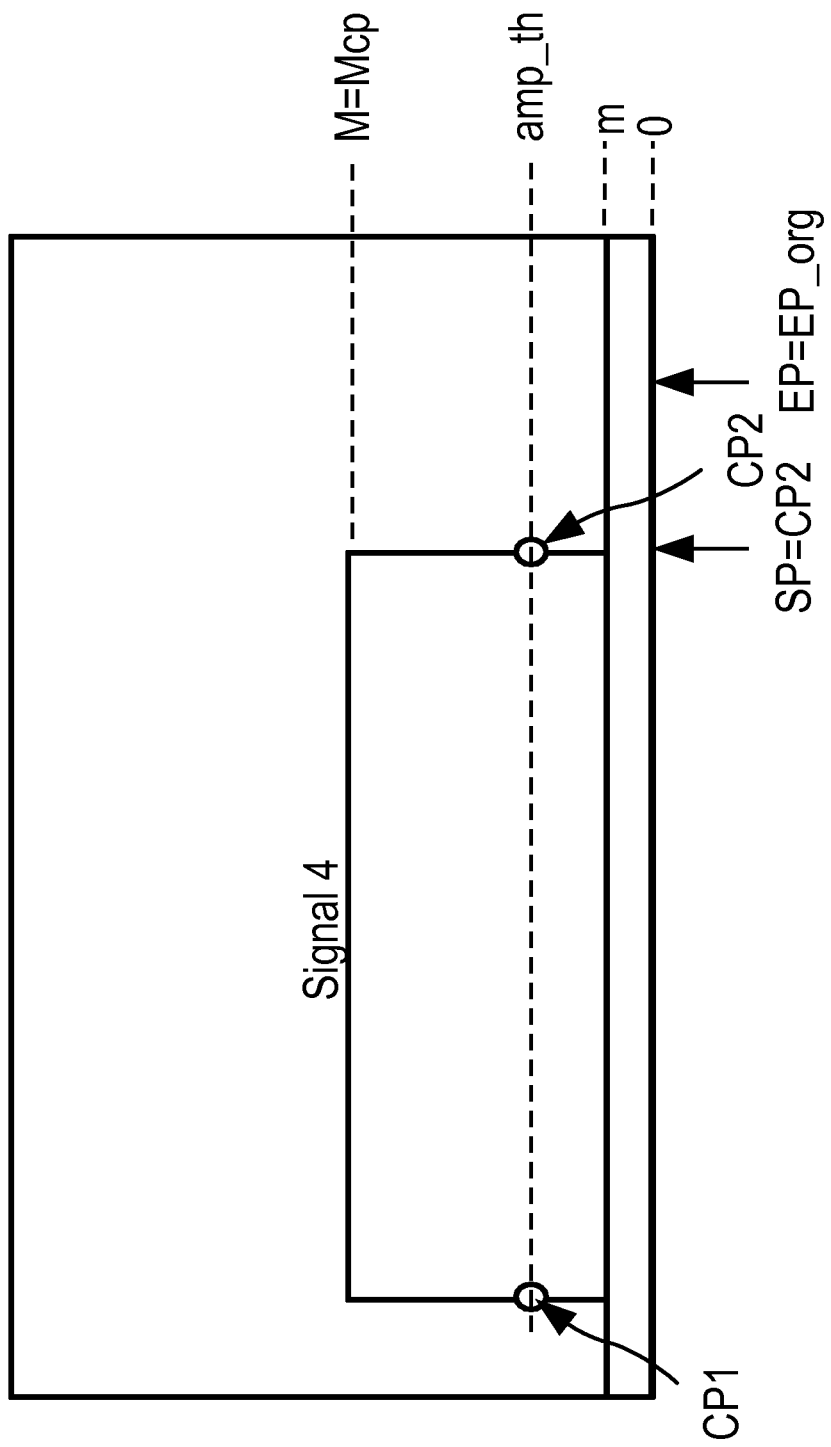

With reference to FIG. 14, after executing steps (C) and (D), signal 4 in step (E) is detected and its parameters are extracted. Next, step (F) sets the start pointer SP to be a frequency of the second cross point CP2, as shown in FIG. 15. When the difference between the start pointer SP and the end pointer EP is not smaller than the second frequency gap threshold BW_th2, steps (H), (N), and (O) are executed to fetch the next block of spectrum, as shown in FIG. 16.

Figure 16:
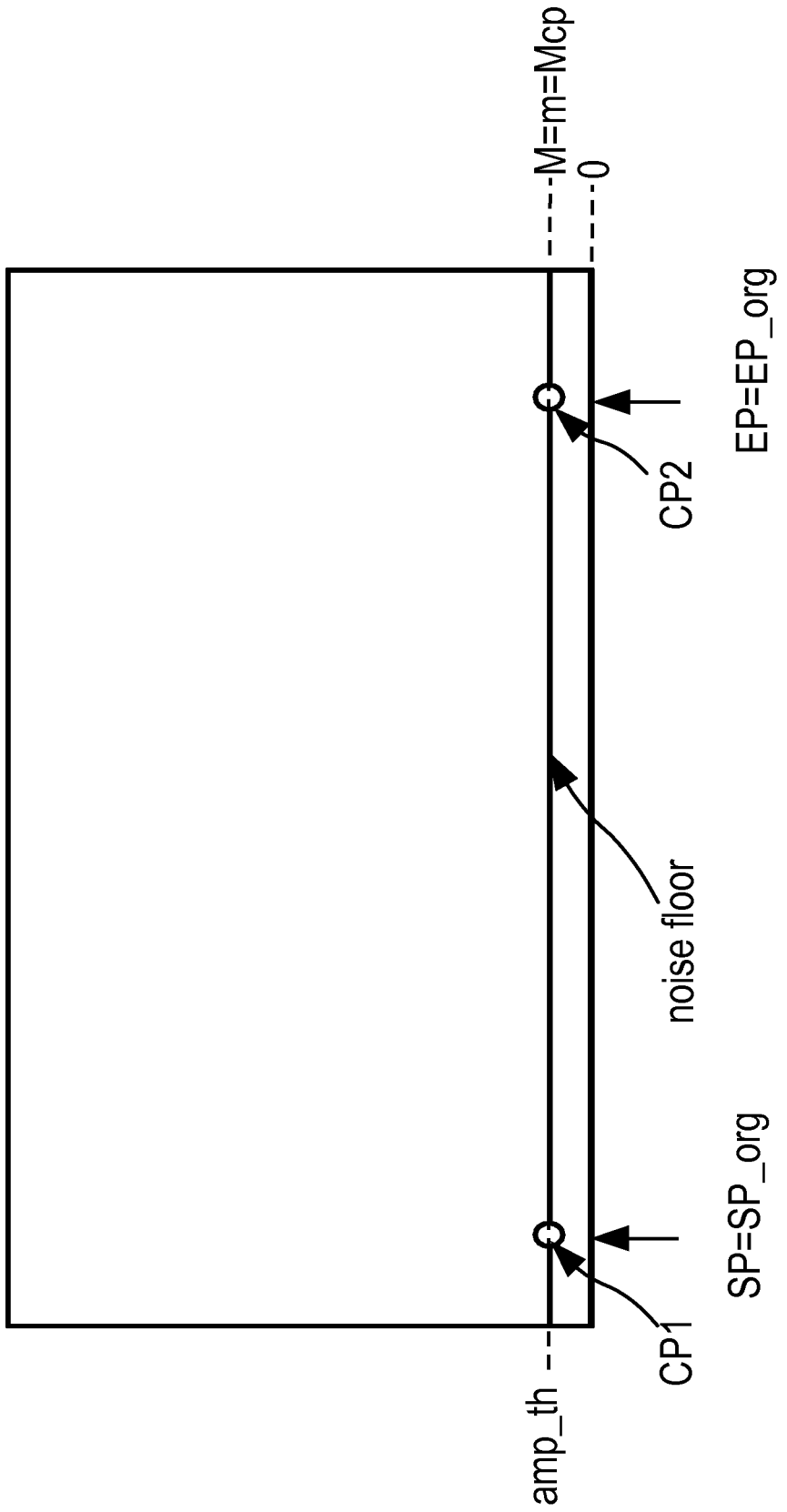
Figure 17:
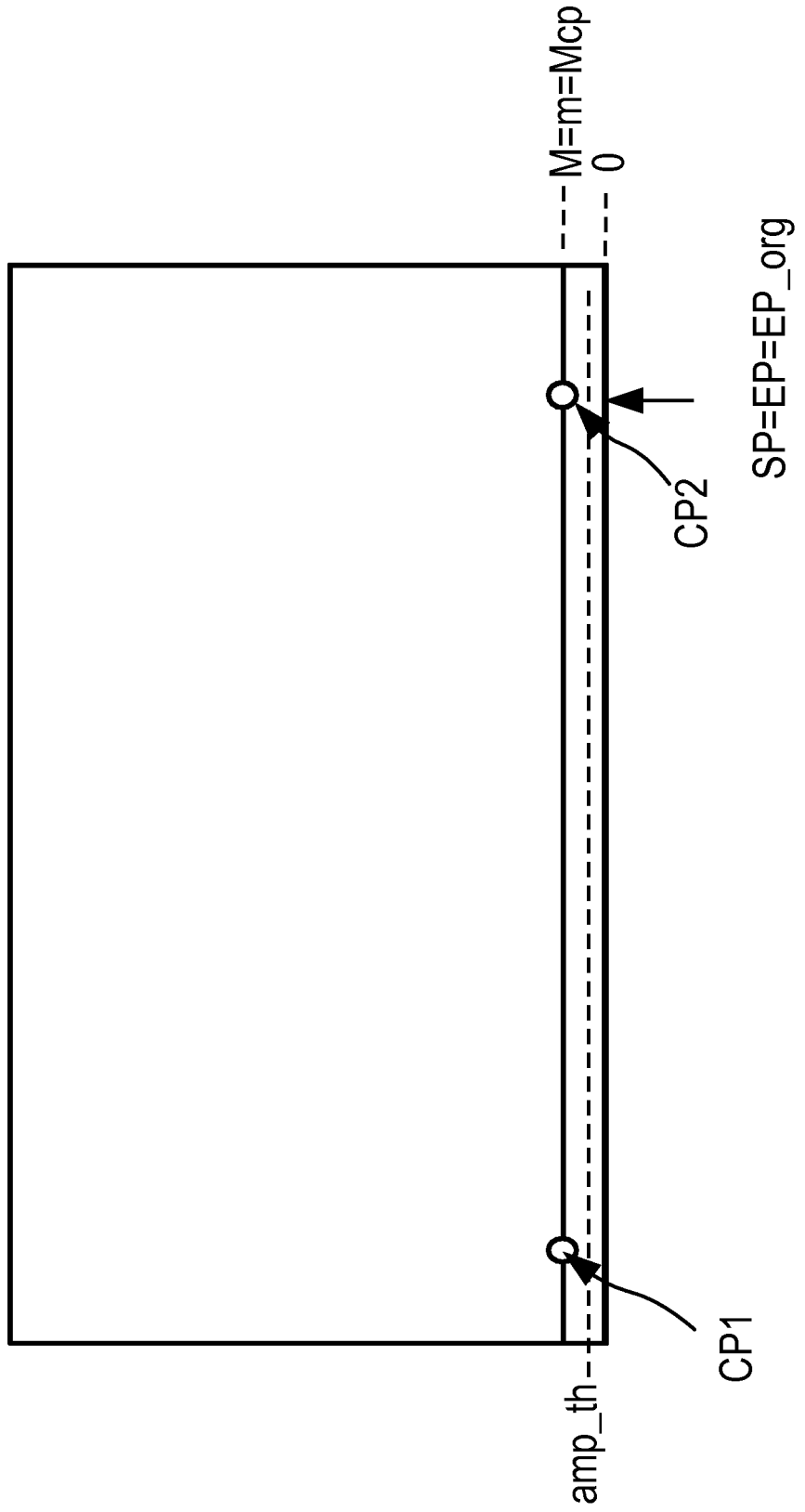

Since there is no signal between the start pointer SP and the end pointer EP in FIG. 16, the amplitude threshold is about the noise floor. In this case, the first cross point CP1 equals to the start pointer SP, and the second cross point CP2 equals to the end pointer EP. After executing steps (C) and (D), step (J) determines whether there is an empty channel. When the expression (CP1=SP_org)&(CP2=EP_org) in step (J) is satisfied, step (K) is executed to set the start pointer SP to be the end pointer EP, so as to skip the spectrum between the start pointer SP and the end pointer EP, as shown in FIG. 17. Next, steps (H), (N), and (O) are executed to fetch the next block of spectrum, as shown in FIG. 18.

Figure 18:
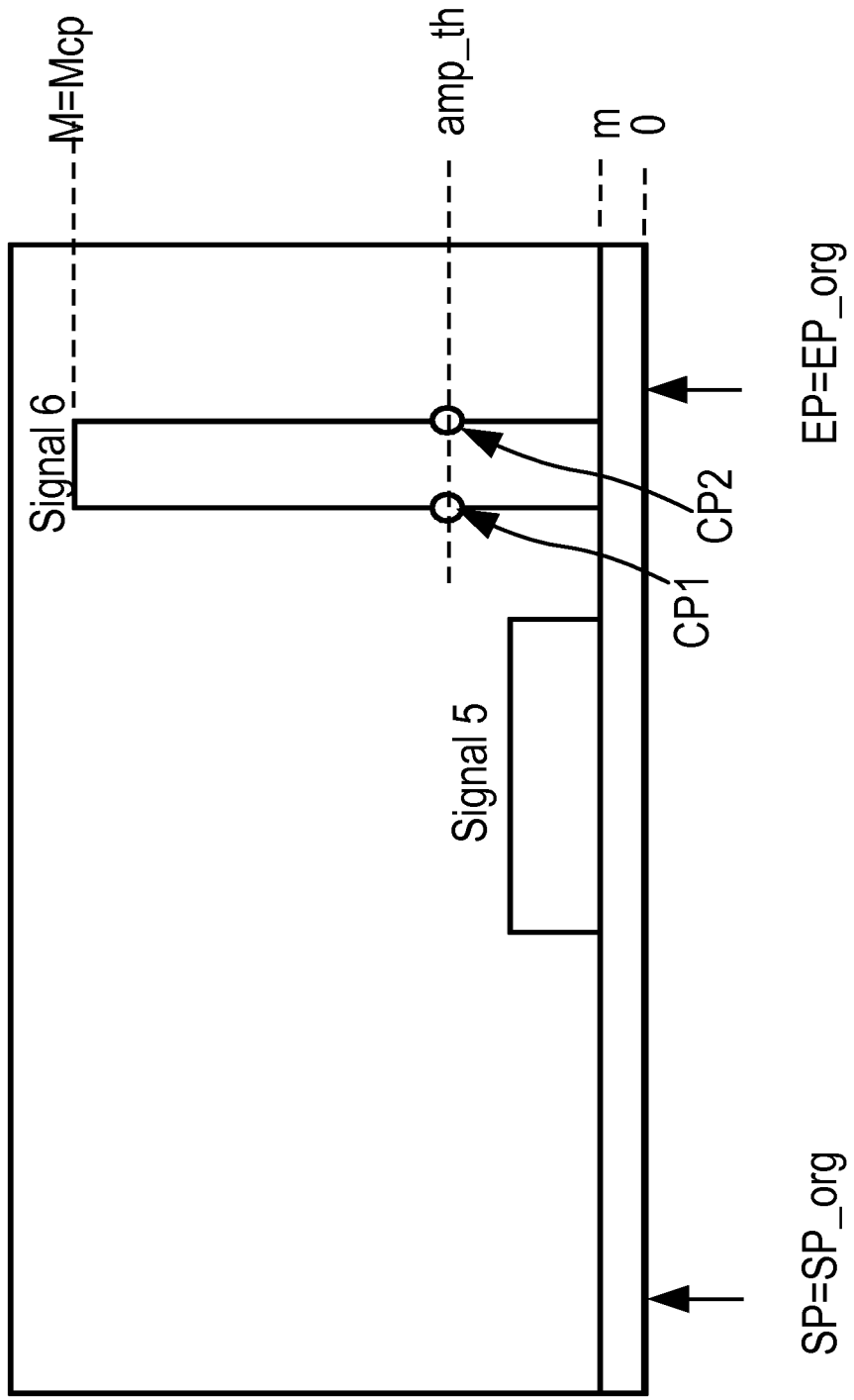
Figure 19:
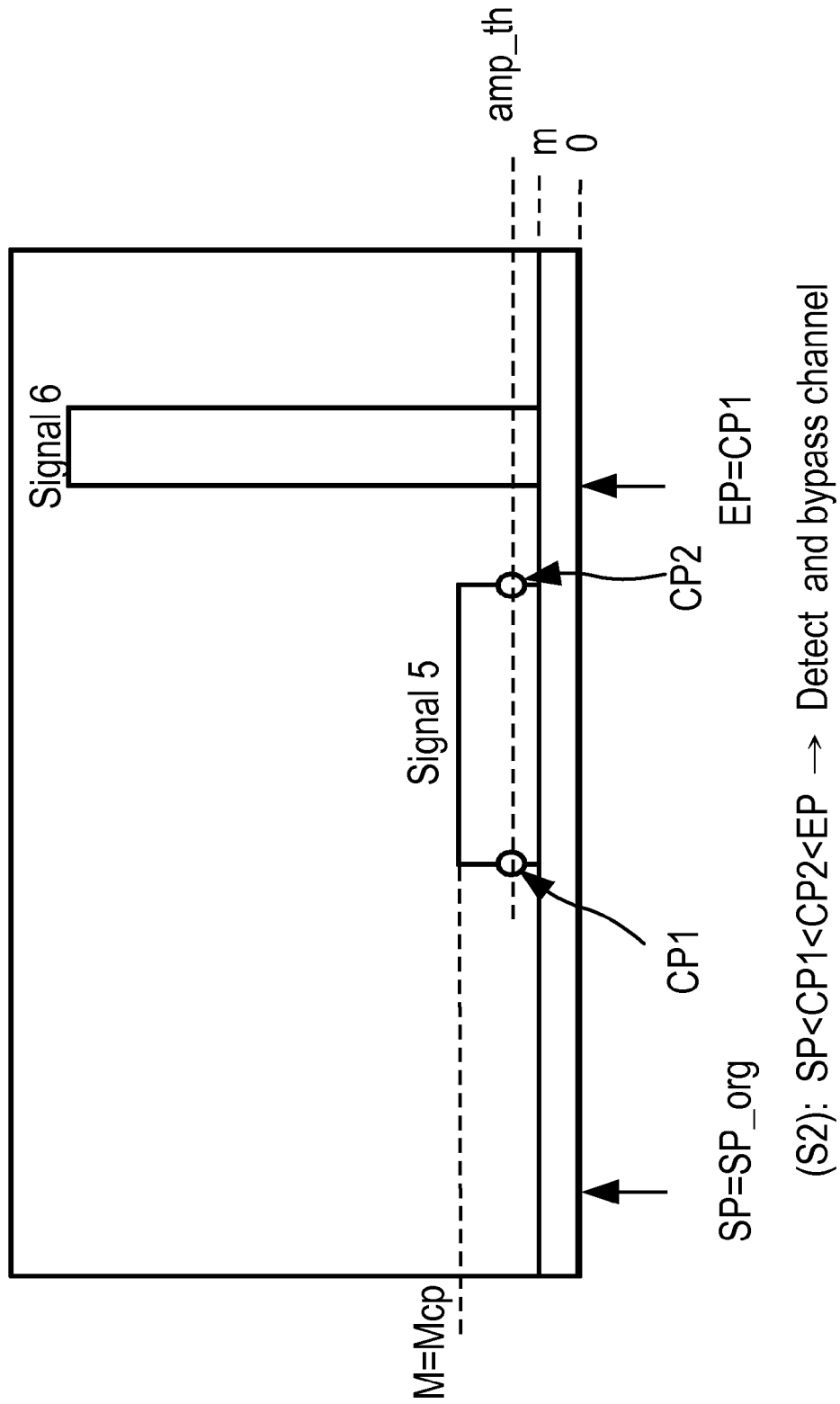

With reference to FIG. 18, as signal 6 has a high spectrum amplitude and the difference between signal 6 and the start pointer SP is greater than the first frequency gap threshold BW_th1, it indicates that the expression in step (C) is satisfied, and thus step (I) is executed to set the end pointer EP to be a frequency of the second cross point CP2, as shown in FIG. 19. Next, after executing steps (C) and (D), signal 5 in step (E) is detected and its parameters are extracted. With reference to FIG. 19, step (F) sets the start pointer SP to be a frequency of the second cross point CP2, as shown in FIG. 20.

Figure 20:
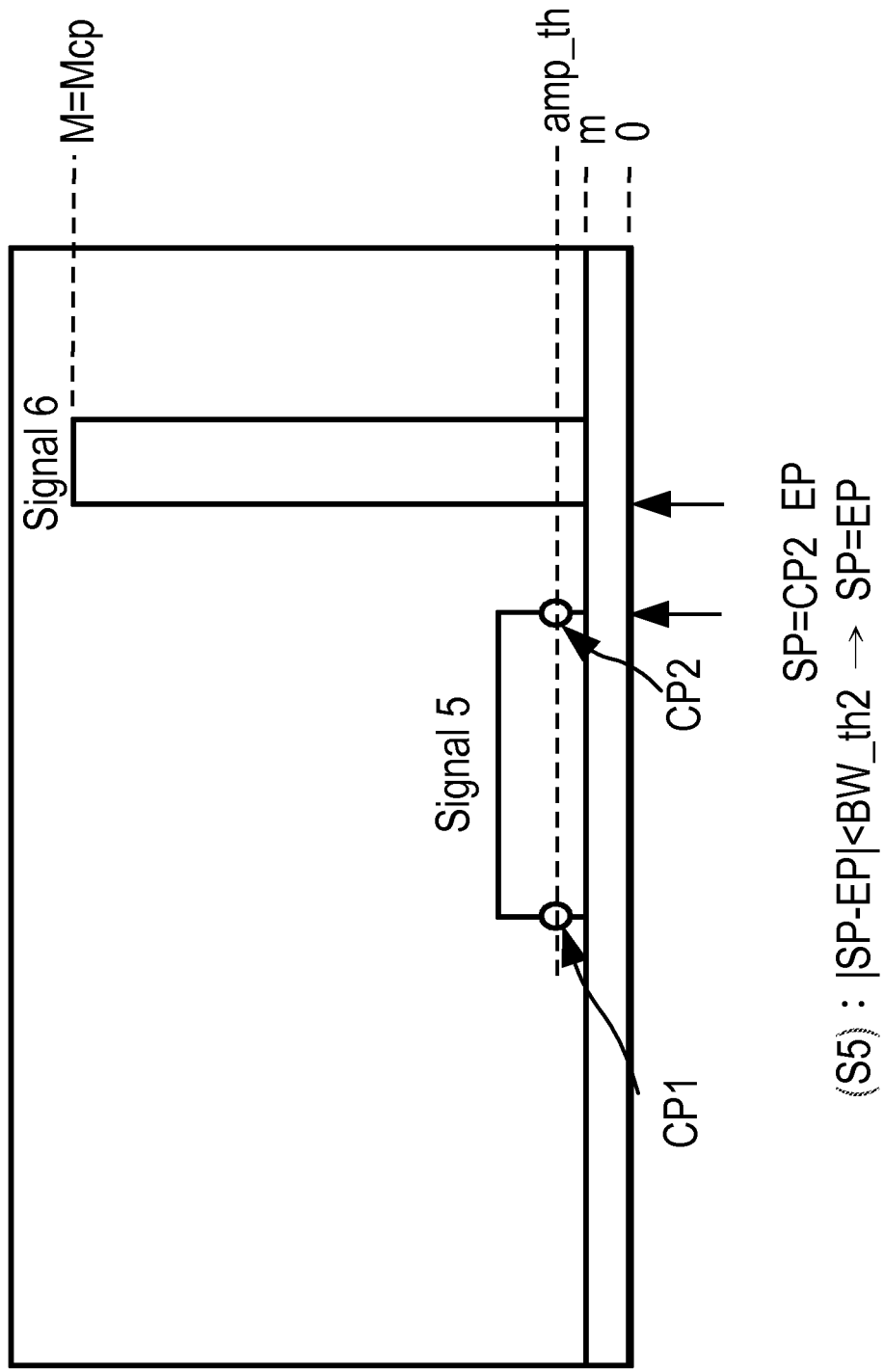
Figure 21:
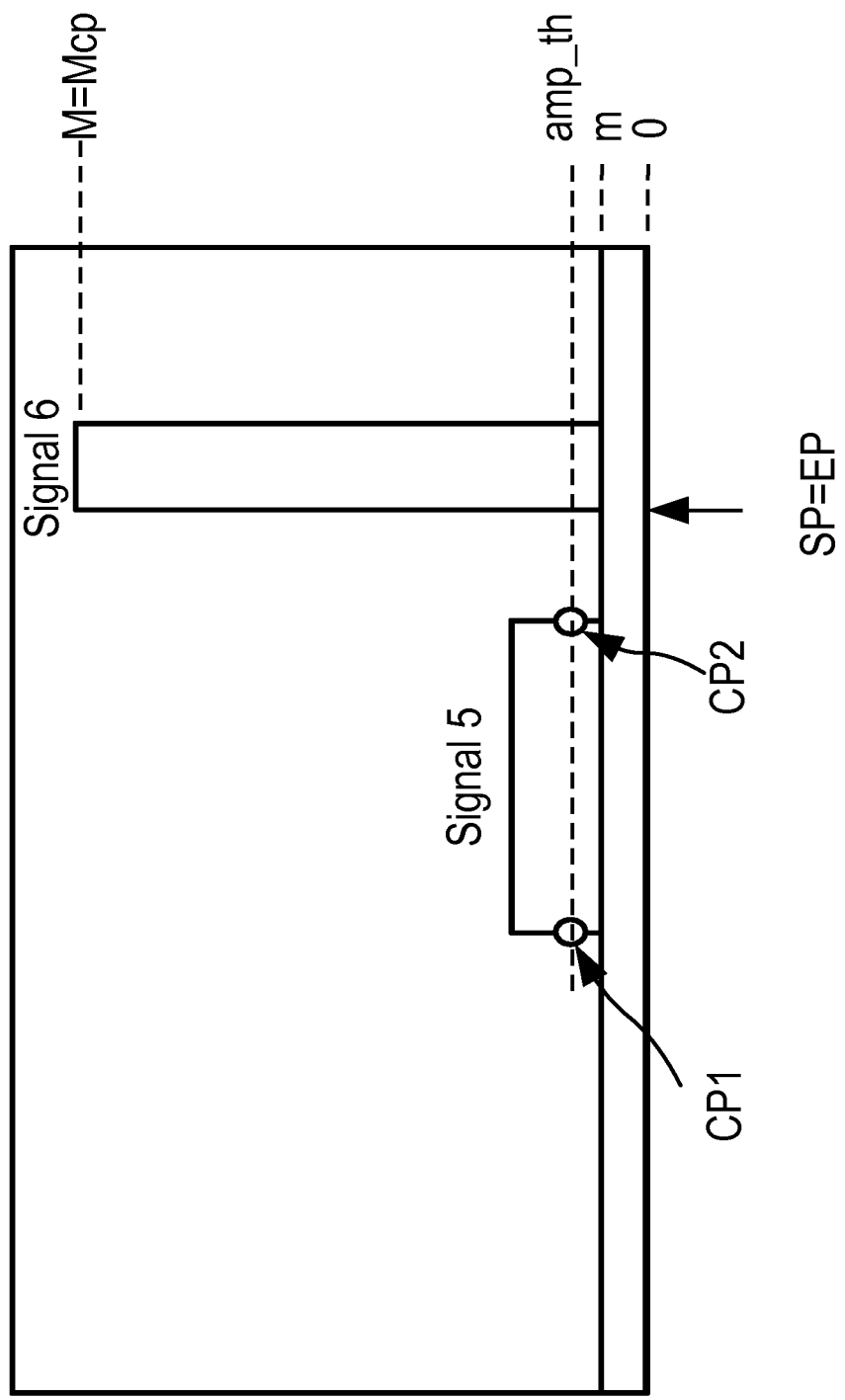

With reference to FIG. 20, when step (G) determines that the difference between the start pointer SP and the end pointer EP is smaller than the second frequency gap threshold BW_th2, it indicates that the spectrum between the start pointer SP and the end pointer EP is too small to have a signal, so as to skip the frequencies between the start pointer SP and the end pointer EP, and then step (K) is executed to set SP=EP, as shown in FIG. 21. Next, steps (H), (N), and (O) are executed to fetch the next block of spectrum, as shown in FIG. 22.

Figure 22:
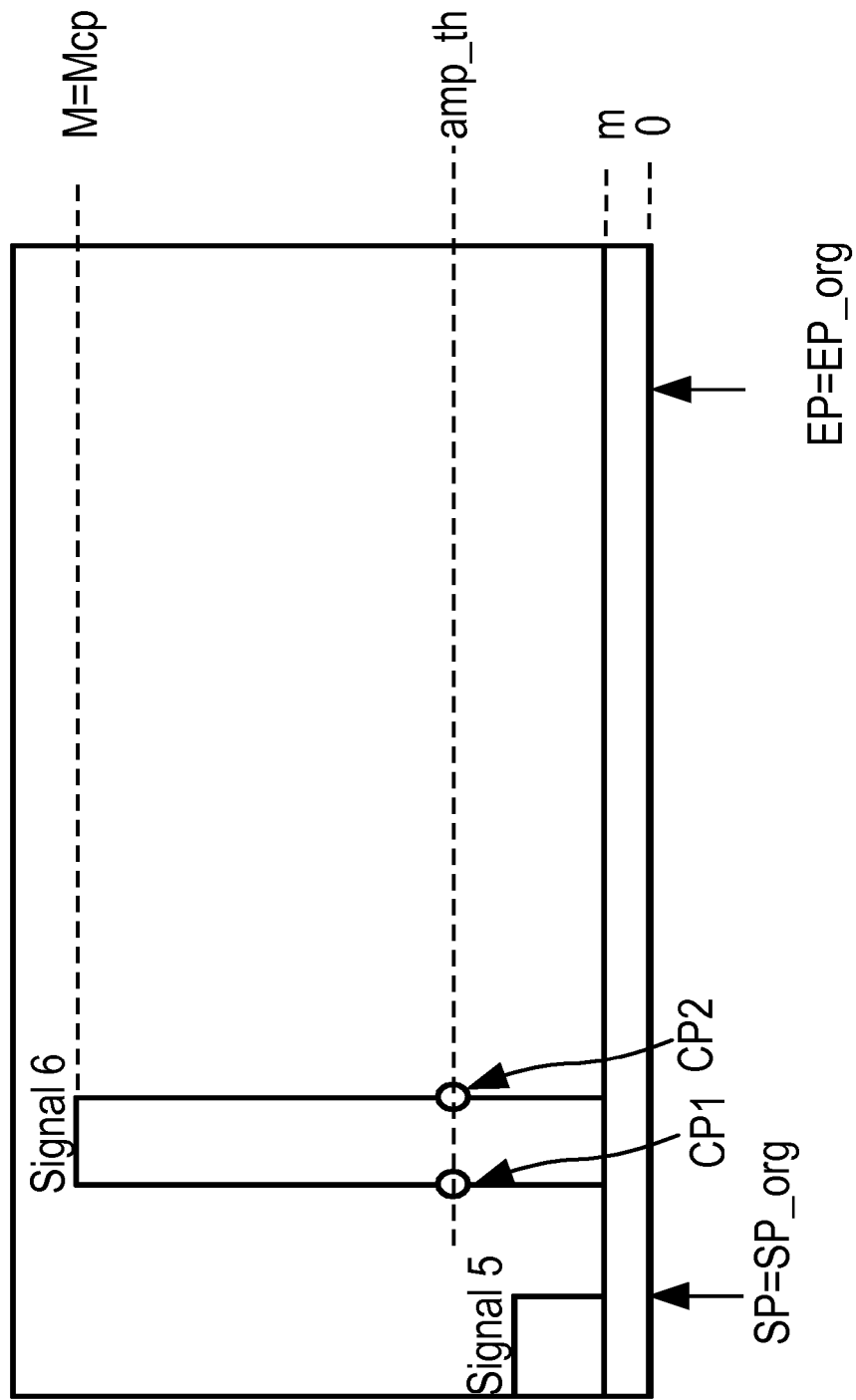
Figure 23:
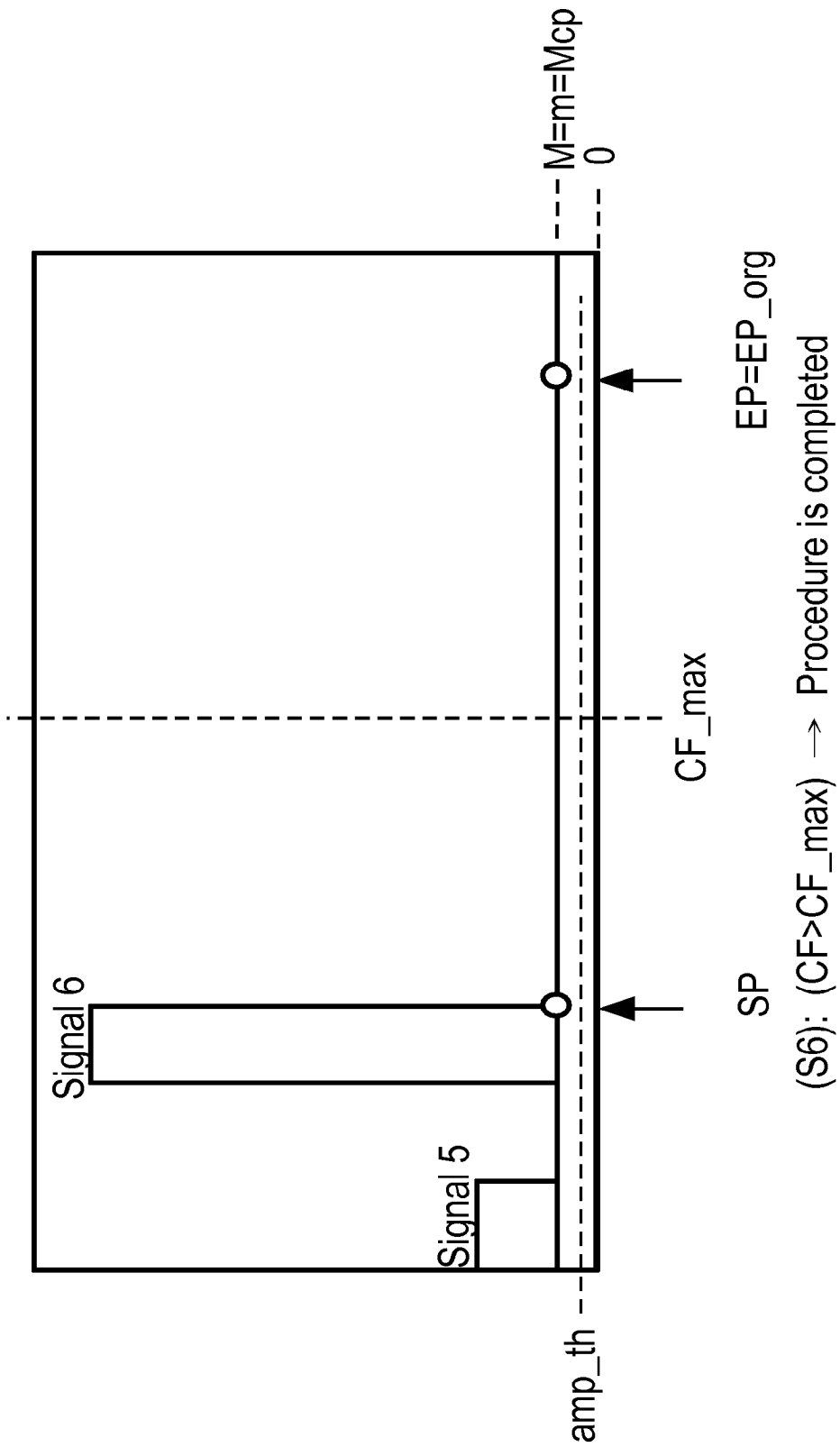

With reference to FIG. 22, after executing steps (C), (D), (E), (F), (G), and (H), CF=CF+SP−SP_org is set to detect and bypass the channel. Next, as shown in FIG. 23, step (N) determines whether the search range of spectrum is completely scanned. When CF is greater than the carrier frequency maximum CF_max, the blind scan method ends.

FIG. 24 shows a table of comparison between the present invention and the prior art, in which the tuner Sharp7306 provided by the Sharp Corporation is used and the time required for generating a frame by the blind scan method is measured. The range of transmission band of the DVB-S/S2 system is from 950 MHz to 2150 MHz and is divided into two bands: C(22K) for the former 600 MHz and Ku(non-22K) for the latter 600 MHz. In addition, each band is divided into a vertical polarization and a horizontal polarization. As shown in FIG. 24, for the 22 k vertical polarization, the present invention takes 1 minute and 16 seconds (1'16"), and the prior art takes 2 minutes and 1 second (2'1"). For the non-22 k vertical polarization, the present invention takes 12 seconds (12"), and the prior art takes 35 seconds (35"). For the 22 k horizontal polarization, the present invention takes 1 minute and 7 seconds (1'7"), and the prior art takes 1 minute and 27 seconds (1'27"). For the non-22 k horizontal polarization, the invention takes 1 minute and 58 seconds (1'58"), and the prior art takes 3 minutes and 55 seconds (3'55").

As cited, the present invention uses the expression in step (C) to prevent a small spectrum signal from being interfered by an adjacent high spectrum signal, so that the small spectrum signal in the DVB-S/S2 system can be accurately detected. In addition, the expressions in steps (G) and (J) can speed up scanning of the signals in the DVB-S/S2. Thus, the present invention has better detection performance in the practical measurement in comparison with the prior art. The present invention also uses the analog tuner to have a larger step size for extracting and scanning the entire spectrum, so as to fetch a new block of spectrum in analog domain. The present invention also uses a digital mixer to detect a subsequent channel and parameters in digital domain, so as to relatively increase the speed of the entire blind scan method. The present invention is based on the spectrum found in each calculated loop to dynamically tune the tuning factor η, so as to adaptively decide the amplitude threshold amp_th and further detect high and low channels in the spectrum to the utmost, thereby reducing the possibility of loss in scanning channels. In addition, since the number of changing the carrier frequency of the tuner 12 is minimized, it is able to finally achieve the channel targets in fast and accurate search.

Although the present invention has been explained in relation to its preferred embodiment, it is to be understood that many other possible modifications and variations can be made without departing from the spirit and scope of the invention as hereinafter claimed.

What is claimed is:

1. A fast blind scan method insensitive to adjacent channel interference, comprising the steps:
   (A) initializing pointers;
   (B) configuring a tuner for fetching a block of spectrum;
   (C) determining whether the block of spectrum contains a high spectrum signal and whether a difference between a carrier frequency of the high spectrum signal and a start pointer is greater than a first frequency gap threshold;
   (D) determining whether there is a full band channel in the block of spectrum when the high spectrum signal in the block of spectrum is absent or the difference between the carrier frequency of the high spectrum signal and the start pointer is not greater than the first frequency gap threshold;
   (E) performing a signal detection and parameter extraction operation when the full band channel exists in the block of spectrum;
   (F) setting the start pointer to be a frequency of a second cross point;

(G) checking whether a difference between the start pointer and an end pointer is smaller than a second frequency gap threshold; and (H) setting a carrier frequency pointer when the difference between the start pointer and the end pointer is not smaller than the second frequency gap threshold, and executing step (B) to enable the tuner to fetch a next block of spectrum.

2. The method as claimed in claim 1, further comprising the step of:

(I) setting the end pointer to be a frequency of a first cross point when it is determined in step (C) that the block of spectrum contains the high spectrum signal and the difference between the carrier frequency of the high spectrum signal and the start pointer is greater than the first frequency gap threshold.

3. The method as claimed in claim 2, further comprising the step of:

(J) determining whether there is an empty channel in the block of spectrum when it is determined in step (D) that the full band channel in the block of spectrum is absent.

4. The method as claimed in claim 3, further comprising the step of:

(K) setting the start pointer to be the end pointer when it is determined in step (J) that there is the empty channel in the block of spectrum.

5. The method as claimed in claim 4, further comprising the step of:

(L) determining whether there is a partial band channel in the block of spectrum when it is determined in step (J) that the empty channel in the block of spectrum is absent.

6. The method as claimed in claim 5, further comprising the step of:

(M) setting the start pointer to be the frequency of the first cross point when it is determined in step (L) that there is the partial band channel in the block of spectrum.

7. The method as claimed in claim 5, wherein step (B) is executed when it is determined in step (L) that the partial band channel in the block of spectrum is absent.

8. The method as claimed in claim 7, further comprising the steps of:

(N) determining whether a search range of spectrum is completely scanned, and ending the method when the search range of spectrum is completely scanned; and (O) setting the start pointer and the end pointer when the search range of spectrum is not completely scanned, and then executing step (B).

9. The method as claimed in claim 8, wherein step (K) is executed when it is determined in step (G) that the difference between the start pointer and the end pointer is smaller than the second frequency gap threshold.

10. The method as claimed in claim 9, wherein a highest value in the block of spectrum is eight times a lowest value in the block of spectrum to indicate that the block of spectrum contains the high spectrum signal in step (C).

11. The method as claimed in claim 9, wherein the full band channel in step (D) indicates that a frequency of the end pointer is greater than the frequency of the second cross point, the frequency of the second cross point is greater than the frequency of the first cross point, and the frequency of the first cross point is greater than a frequency of the start pointer.

12. The method as claimed in claim 8, wherein the first cross point indicates a position where a frequency in the block of spectrum is greater than an amplitude threshold at a first time, and the second cross point indicates a position where a frequency in the block of spectrum is smaller than the amplitude threshold at a first time.

13. The method as claimed in claim 12, wherein the amplitude threshold is expressed as:

$$\text{amp\_th} = (M-m) \times \eta,$$

where M represents the highest value in the block of spectrum, m represents the lowest value in the block of spectrum, and $\eta$ represents a tuning factor.

14. The method as claimed in claim 13, wherein the empty channel in step (J) indicates that the frequency of the first cross point equals to an original start pointer and the frequency of the second cross point equals to an original end pointer.

15. The method as claimed in claim 14, wherein the partial band channel in step (L) indicates that the frequency of the second cross point is greater than the end pointer.

16. The method as claimed in claim 14, wherein a position where the carrier frequency pointer is greater that a carrier frequency maximum indicates that the search range of spectrum in step (N) is completely scanned.

* * * * *